(12) United States Patent
Liu et al.

(10) Patent No.: US 12,162,016 B2
(45) Date of Patent: Dec. 10, 2024

(54) APPARATUS AND METHOD FOR HANDLING SAMPLE CONTAINERS

(71) Applicant: Beckman Coulter, Inc., Brea, CA (US)

(72) Inventors: Niandong Liu, Eagan, MN (US); Amit Sawhney, Minneapolis, MN (US); Daniel C. Massa, Lakeville, MN (US)

(73) Assignee: Beckman Coulter, Inc., Brea, CA (US)

( * ) Notice: Subject to any disclaimer, the term of this patent is extended or adjusted under 35 U.S.C. 154(b) by 0 days.

(21) Appl. No.: 18/064,427

(22) Filed: Dec. 12, 2022

(65) Prior Publication Data

US 2023/0114837 A1    Apr. 13, 2023

Related U.S. Application Data

(63) Continuation of application No. 16/622,168, filed as application No. PCT/US2018/037930 on Jun. 15, 2018, now abandoned.
(Continued)

(51) Int. Cl.
*B01L 9/06* (2006.01)
*B01L 9/00* (2006.01)
*G01N 35/04* (2006.01)

(52) U.S. Cl.
CPC ...... *B01L 9/06* (2013.01); *B01L 9/50* (2013.01); *G01N 35/04* (2013.01);
(Continued)

(58) Field of Classification Search
CPC ........ B01L 9/06; B01L 9/50; B01L 2200/023; B01L 2200/025; B01L 2200/087;
(Continued)

(56) References Cited

U.S. PATENT DOCUMENTS 3,604,566 A    9/1971    Rem et al.
4,090,850 A    5/1978    Chen et al.
(Continued)

FOREIGN PATENT DOCUMENTS

EP    0965385 A2    12/1999
EP    3639040       2/2024
(Continued)

OTHER PUBLICATIONS

"U.S. Appl. No. 15/352,473, Advisory Action mailed Jan. 2, 2020", 4 pgs.
(Continued)

*Primary Examiner* — Dean Kwak
(74) *Attorney, Agent, or Firm* — Schwegman Lundberg & Woessner, P.A.

(57) ABSTRACT

A sample rack includes a housing that has multiple spaces or compartments each for receiving and retaining sample containers of various sizes. The sample rack includes dual hooks on the ends for engaging a sample rack handling system. Chamfers formed in the housing of the sample rack assist in placing and removing the sample rack from a sample rack handling system. The sample tube rack also includes a handle that extends upward from one end and includes gripping features. A groove and bar, incorporated into each sample rack, are able to selectively interlock with adjacent racks to assist in lifting multiple sample racks together.

17 Claims, 26 Drawing Sheets

Related U.S. Application Data

(60) Provisional application No. 62/521,293, filed on Jun. 16, 2017.

(52) U.S. Cl.
CPC ... *B01L 2200/023* (2013.01); *B01L 2200/025* (2013.01); *B01L 2200/087* (2013.01); *B01L 2200/18* (2013.01); *B01L 2300/021* (2013.01); *G01N 2035/0412* (2013.01)

(58) Field of Classification Search
CPC .......... B01L 2200/18; B01L 2300/021; B01L 3/5021; B01L 2300/024; B01L 3/523; B01L 2300/0848; B01L 2300/08; G01N 35/04; G01N 2035/0412; G01N 2035/0405; G01N 2035/00801; G01N 2035/1048; G01N 2035/1051; G01N 35/02

See application file for complete search history.

(56) References Cited

U.S. PATENT DOCUMENTS

| | | |
|---|---|---|
| 4,284,603 A | 8/1981 | Korom |
| D265,126 S | 6/1982 | Beall |
| D302,207 S | 7/1989 | Matkovich |
| 5,080,232 A | 1/1992 | Leoncavallo et al. |
| 5,128,105 A | 7/1992 | Berthold |
| 5,169,603 A | 12/1992 | Landsberger |
| 5,318,753 A | 6/1994 | Honda |
| 5,456,360 A | 10/1995 | Griffin |
| 5,579,929 A | 12/1996 | Schwartz |
| 5,651,941 A | 7/1997 | Stark et al. |
| D382,346 S | 8/1997 | Buhler et al. |
| 5,687,849 A | 11/1997 | Borenstein et al. |
| 5,720,377 A | 2/1998 | Lapeus et al. |
| 5,785,927 A | 7/1998 | Scott et al. |
| 5,897,090 A * | 4/1999 | Smith ................ B01L 9/06 248/314 |
| 5,902,549 A | 5/1999 | Mimura et al. |
| D413,391 S | 8/1999 | Lapeus et al. |
| 5,939,024 A | 8/1999 | Robertson |
| D414,271 S | 9/1999 | Mendoza |
| 5,993,745 A | 11/1999 | Laska |
| 5,996,818 A | 12/1999 | Boje et al. |
| D420,743 S | 2/2000 | Monks |
| D428,497 S | 7/2000 | Lapeus et al. |
| 6,132,684 A | 10/2000 | Marino |
| 6,190,619 B1 | 2/2001 | Kilcoin et al. |
| D448,854 S | 10/2001 | Kuiper et al. |
| 6,343,690 B1 | 2/2002 | Britton et al. |
| D461,554 S | 8/2002 | Lafond et al. |
| D466,219 S | 11/2002 | Wynschenk et al. |
| 6,533,133 B2 | 3/2003 | Liu |
| 6,568,544 B1 | 5/2003 | Lafond et al. |
| 6,932,942 B2 | 8/2005 | Itoh |
| 7,000,785 B2 | 2/2006 | Jafari et al. |
| 7,122,158 B2 | 10/2006 | Itoh |
| 7,169,361 B2 | 1/2007 | Arnold et al. |
| 7,191,904 B2 | 3/2007 | Wescott, III |
| 7,282,182 B2 | 10/2007 | Dale et al. |
| D595,420 S | 6/2009 | Suzuki et al. |
| D596,312 S | 7/2009 | Giraud et al. |
| 7,611,675 B2 | 11/2009 | Sevigny et al. |
| D622,860 S | 8/2010 | Karpiloff |
| D628,305 S | 11/2010 | Gorrec et al. |
| D628,306 S | 11/2010 | Blanc et al. |
| 7,824,615 B2 | 11/2010 | Balli |
| D632,404 S | 2/2011 | Karpiloff |
| 7,910,067 B2 | 3/2011 | Knight et al. |
| D639,447 S | 6/2011 | Karpiloff |
| 8,312,781 B2 | 11/2012 | Himmelsbach et al. |
| D672,881 S | 12/2012 | Kraihanzel |
| D674,507 S | 1/2013 | Suzuki et al. |
| D675,338 S | 1/2013 | Suzuki et al. |
| D675,748 S | 2/2013 | Hilligoss et al. |
| D686,749 S | 7/2013 | Trump |
| 8,580,195 B2 | 11/2013 | Frey et al. |
| D699,371 S | 2/2014 | Williams et al. |
| D710,024 S | 7/2014 | Guo |
| 8,845,985 B2 | 9/2014 | Herchenbach et al. |
| 8,940,252 B2 | 1/2015 | Ziegler |
| D724,236 S | 3/2015 | Motadel et al. |
| D729,404 S | 5/2015 | Teich et al. |
| 9,046,506 B2 | 6/2015 | Muller et al. |
| 9,144,801 B2 | 9/2015 | Johnson et al. |
| 9,358,542 B2 | 6/2016 | Tyagi et al. |
| 9,423,409 B2 | 8/2016 | Friedman |
| 9,446,900 B2 | 9/2016 | Takai et al. |
| D768,870 S | 10/2016 | Kuhn et al. |
| 9,482,684 B2 | 11/2016 | Johns et al. |
| 9,505,005 B2 | 11/2016 | Takai |
| D774,659 S | 12/2016 | Quackenbush et al. |
| 9,630,179 B2 | 4/2017 | Knight et al. |
| D785,428 S | 5/2017 | Friesen |
| D787,087 S | 5/2017 | Duffy et al. |
| 9,636,681 B2 | 5/2017 | Ohga et al. |
| 9,638,610 B2 | 5/2017 | Nagai et al. |
| 9,638,709 B2 | 5/2017 | Nagai et al. |
| 9,746,486 B2 | 8/2017 | Yan et al. |
| 9,796,574 B2 | 10/2017 | Frey et al. |
| D808,540 S | 1/2018 | Johns et al. |
| D812,243 S | 3/2018 | Johns et al. |
| D812,244 S | 3/2018 | Shanafelter et al. |
| 9,943,849 B2 | 4/2018 | Johnson et al. |
| D825,774 S | 8/2018 | Self et al. |
| D827,149 S | 8/2018 | Self et al. |
| 10,040,068 B2 | 8/2018 | Sattler et al. |
| D832,456 S | 10/2018 | Self et al. |
| D838,380 S | 1/2019 | Self et al. |
| D840,053 S | 2/2019 | Kamees et al. |
| D843,014 S | 3/2019 | Johns et al. |
| D844,806 S | 4/2019 | Johns et al. |
| D849,961 S | 5/2019 | Muller et al. |
| D854,707 S | 7/2019 | Jakobsen et al. |
| D885,605 S | 5/2020 | Johns et al. |
| 10,882,047 B2 | 1/2021 | Peltosaari |
| 10,970,504 B2 | 4/2021 | Opalsky |
| 2002/0068022 A1 | 6/2002 | Schneider |
| 2002/0108917 A1 | 8/2002 | Maruyama |
| 2003/0017084 A1 | 1/2003 | Dale et al. |
| 2003/0215365 A1 | 11/2003 | Sevigny |
| 2003/0235519 A1 | 12/2003 | Sha et al. |
| 2005/0180895 A1 | 8/2005 | Itoh |
| 2005/0194333 A1 | 9/2005 | Veiner et al. |
| 2006/0266719 A1* | 11/2006 | Knight ................ G01N 35/025 211/74 |
| 2008/0024301 A1 | 1/2008 | Fritchie et al. |
| 2008/0131328 A1 | 6/2008 | Schutt et al. |
| 2009/0065458 A1 | 3/2009 | Murray |
| 2010/0203643 A1 | 8/2010 | Self et al. |
| 2011/0274595 A1 | 11/2011 | Ziegler |
| 2011/0306118 A1 | 12/2011 | Belz et al. |
| 2012/0195808 A1 | 8/2012 | Arras et al. |
| 2013/0195720 A1 | 8/2013 | Behnk et al. |
| 2013/0315800 A1 | 11/2013 | Yin et al. |
| 2014/0140804 A1 | 5/2014 | Focke et al. |
| 2014/0287515 A1 | 9/2014 | Habrich et al. |
| 2015/0101911 A1 | 4/2015 | Friedman |
| 2015/0174579 A1 | 6/2015 | Iten et al. |
| 2016/0101422 A1 | 4/2016 | Bucher et al. |
| 2016/0107158 A1 | 4/2016 | Gray et al. |
| 2016/0161521 A1 | 6/2016 | Sakairi et al. |
| 2016/0320421 A1 | 11/2016 | Trump et al. |
| 2016/0333337 A1 | 11/2016 | Duffy et al. |
| 2017/0043346 A1 | 2/2017 | Welch et al. |
| 2017/0136467 A1 | 5/2017 | Johns et al. |
| 2018/0100868 A1 | 4/2018 | Grimwood et al. |
| 2018/0106820 A1 | 4/2018 | Okabe et al. |
| 2018/0290144 A1 | 10/2018 | Lihl et al. |
| 2018/0292426 A1 | 10/2018 | Abe |
| 2020/0122149 A1 | 4/2020 | Liu et al. |

(56) References Cited

U.S. PATENT DOCUMENTS

FOREIGN PATENT DOCUMENTS

| EP | 3639040 B1 | 2/2024 |
| IN | 505468 | 1/2024 |
| IN | 505468 B | 1/2024 |
| WO | WO-2005093433 A1 | 10/2005 |

OTHER PUBLICATIONS

"U.S. Appl. No. 15/352,473, Appeal Brief filed Mar. 16, 2020", 23 pgs.
"U.S. Appl. No. 15/352,473, Response filed Dec. 16, 2019 to Final Office Action mailed Oct. 16, 2019", 19 pgs.
"European Application Serial No. 18738143.9, Office Action mailed Jun. 27, 2022", 7 pgs.
"Indian Application Serial No. 202047000960, First Examination Report mailed Mar. 7, 2022", 6 pgs.
"Indian Application Serial No. 202047000960, Response filed Sep. 7, 2022 to First Examination Report mailed Mar. 7, 2022", 28 pgs.
U.S. Appl. No. 29/607,873, filed Jun. 16, 2017, Sample Rack.
U.S. Appl. No. 29/683,165, filed Mar. 11, 2019 U.S. Pat. No. D885,605, Sample Tube Rack.
U.S. Appl. No. 16/622,168, filed Dec. 12, 2019, Apparatus and Method for Handling Sample Containers.
"Indian Application Serial No. 202047000960, Hearing Notice mailed Dec. 13, 2023", 2 pgs.
"European Application Serial No. 18738143.9, Communication pursuant to Article 94(3) EPC mailed Oct. 21, 2021", 6 pgs.
"European Application Serial No. 18738143.9, Response filed Feb. 17, 2022 to Communication pursuant to Article 94(3) EPC mailed Oct. 21, 2021", 20 pgs.
"European Application Serial No. 18738143.9, Communication pursuant to Article 94(3) EPC mailed Jun. 27, 2022", 7 pgs.
"European Application Serial No. 18738143.9, Response filed Nov. 9, 2022 to Communication pursuant to Article 94(3) EPC mailed Jun. 27, 2022", 11 pgs.
"European Application Serial No. 18738143.9, Response filed Jan. 10, 2024 to Communication pursuant to R.71(3) EPC mailed Sep. 13, 2023", with machine translation, 13 pgs.

* cited by examiner

APPARATUS AND METHOD FOR HANDLING SAMPLE CONTAINERS

CROSS-REFERENCES TO RELATED APPLICATIONS

The present application is a continuation of U.S. application Ser. No. 16/622,168, filed Dec. 12, 2019, which is a 371 of International Application No. PCT/US2018/037930, filed Jun. 15, 2018, which claims priority to U.S. Provisional Application No. 62/521,293 filed Jun. 16, 2017, each of which is hereby incorporated by reference in its entirety.

BACKGROUND

In a lab setting a sample container, such as a sample tube or sample cup, often contains a sample or specimen for analysis using one or more tests. In some instances, one or more of the tests are conducted in a manner using automated handling of the sample containers. In such an example, the tests themselves may be conducted automatically, manually, or a combination of the two. In handling the sample containers, care is taken to preserve the integrity of the samples to obtain reliable and useful test results. In some instances various apparatuses and methods for handling sample containers are used to assist in holding and transporting one or more sample containers.

While a variety of sample container handling apparatuses and methods have been made and used, it is believed that no one prior to the filing of the present disclosure has made or used one or more of the inventive aspects described herein.

BRIEF DESCRIPTION OF THE DRAWINGS

While the specification concludes with claims which particularly point out and distinctly claim certain aspects of the present disclosure, it is believed that the present disclosure will be better understood from the following description of certain examples taken in conjunction with the accompanying drawings, in which like reference numerals identify the same elements and in which:

Figure 1:
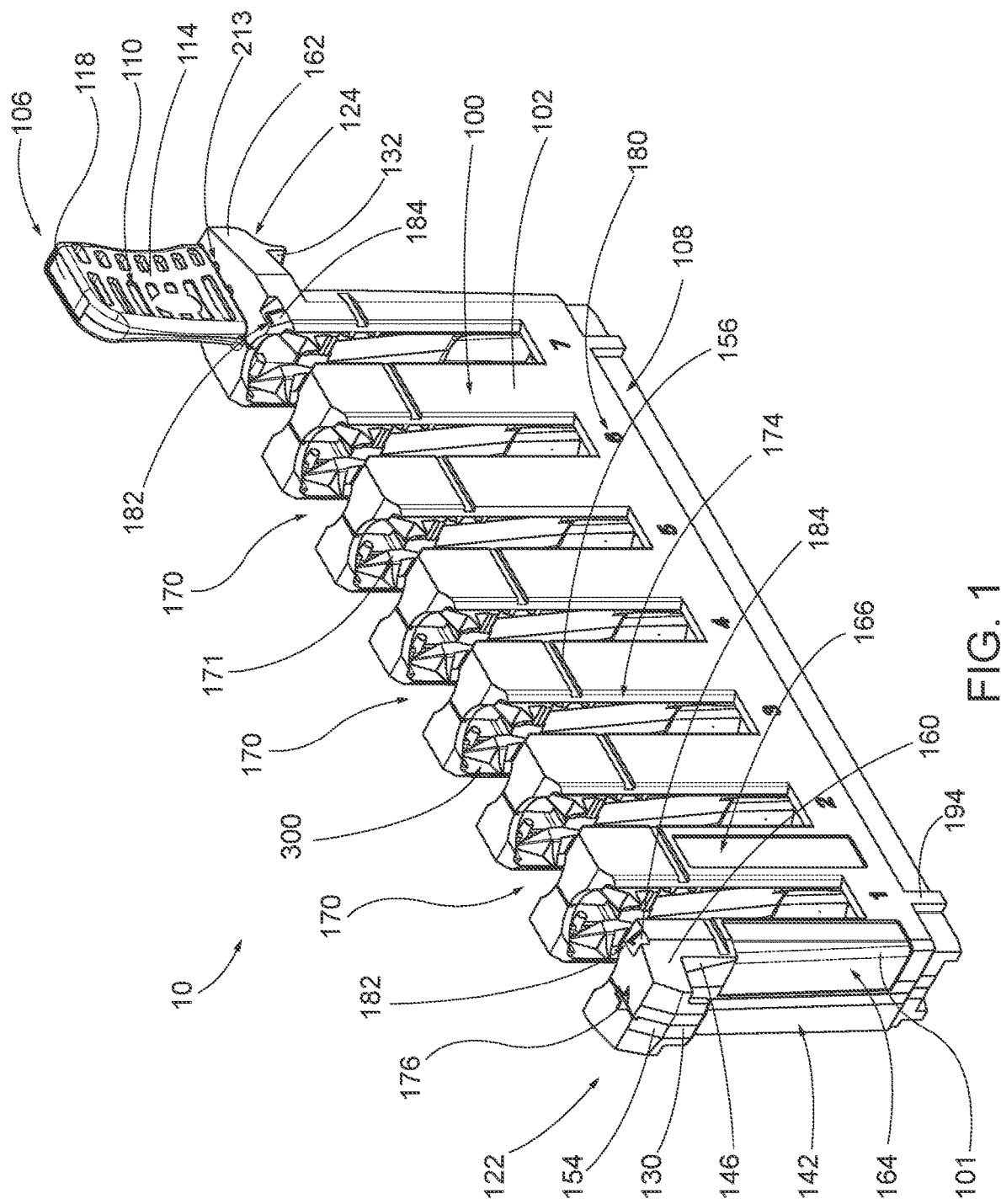
FIG. 1 depicts a top perspective view of an exemplary rack for holding one or more sample containers.

The drawings are not intended to be limiting in any way, and it is contemplated that various embodiments of the present disclosure may be carried out in a variety of other ways, including those not necessarily depicted in the drawings. The accompanying drawings incorporated in and forming a part of the specification illustrate several aspects of the present disclosure, and together with the description serve to explain the principles of the present disclosure; it being understood that the claims are not limited to the arrangements shown.

DETAILED DESCRIPTION

The following description of certain examples of the present disclosure should not be used to limit the scope of the claims. Other examples, features, aspects, embodiments, and advantages of the present disclosure will become apparent to those skilled in the art from the following description, which by way of illustration, includes the best modes contemplated for carrying out certain aspects of the present disclosure. As will be realized, certain aspects of the present disclosure are capable of other different and obvious implementation, all without departing from the principles of the present disclosure. Accordingly, the drawings and descriptions should be regarded as illustrative in nature and not restrictive.

Relative terms describing the orientation of components and features (e.g., upright, bottom, top, etc.) may be used herein. These terms may apply to certain embodiments and/or environments in which the various components and features are used. The terms describing the orientation may also be used for convenience in describing various components, features, and environments herein. In view of the teachings herein, other embodiments and/or environments may include other orientations as will be understood by those of ordinary skill in the art.

I. Exemplary Rack for Sample Container Handling

FIGS. 1-19 illustrate an exemplary rack (10), or portions thereof, for holding one or more sample containers. The sample containers are configured to hold samples or specimens. In some instances the sample containers are configured in the form of a sample tube. In some other instances the sample containers are configured in the form of a sample cup. In the illustrated rack (10) of FIGS. 1-19, rack (10) is configured with features to accommodate sample tubes of various sizes. However, certain features of rack (10) also allow for rack (10) to accommodate sample cups.

Figure 2:
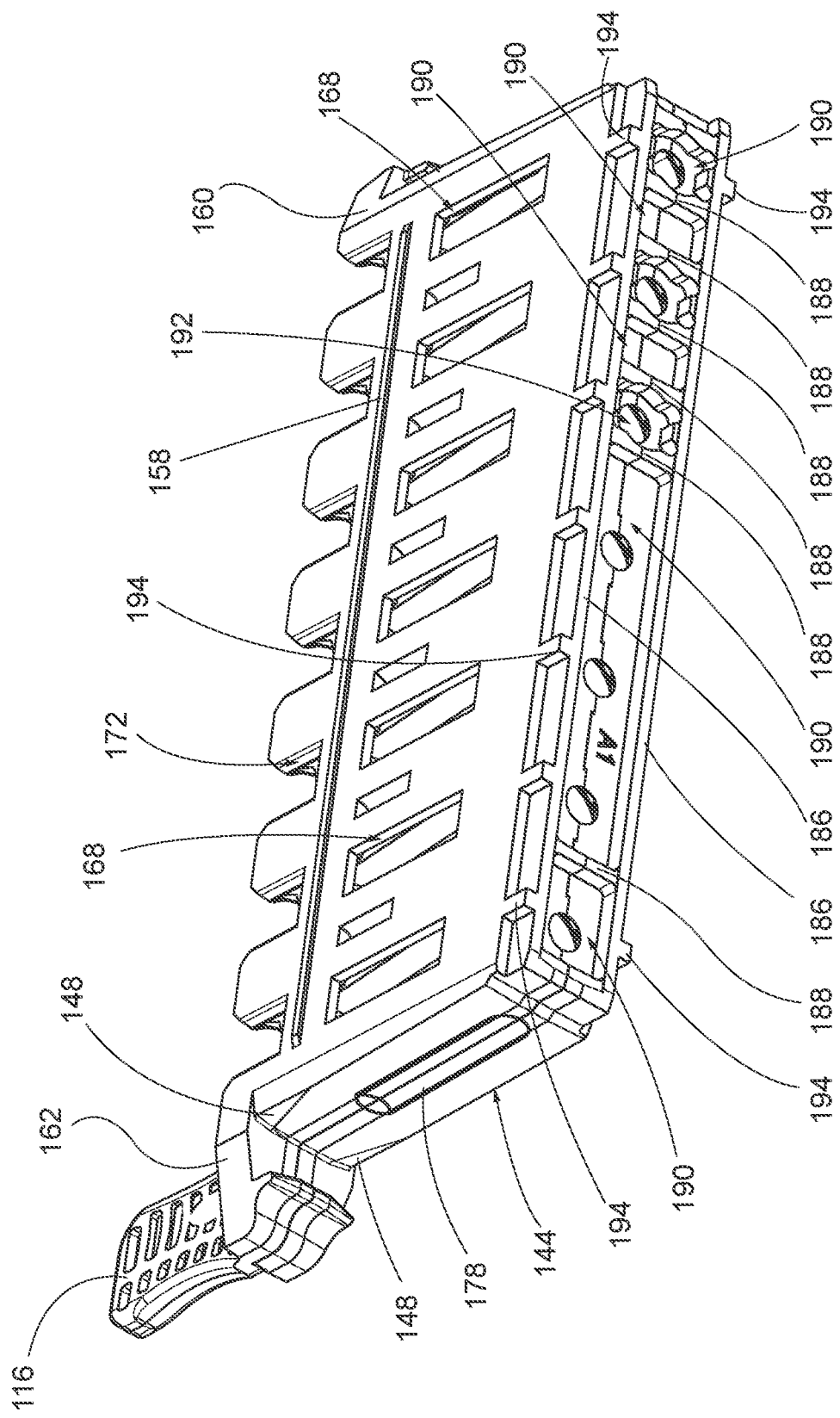
FIG. 2 depicts a bottom perspective view of the rack of FIG. 1.
Figure 3:
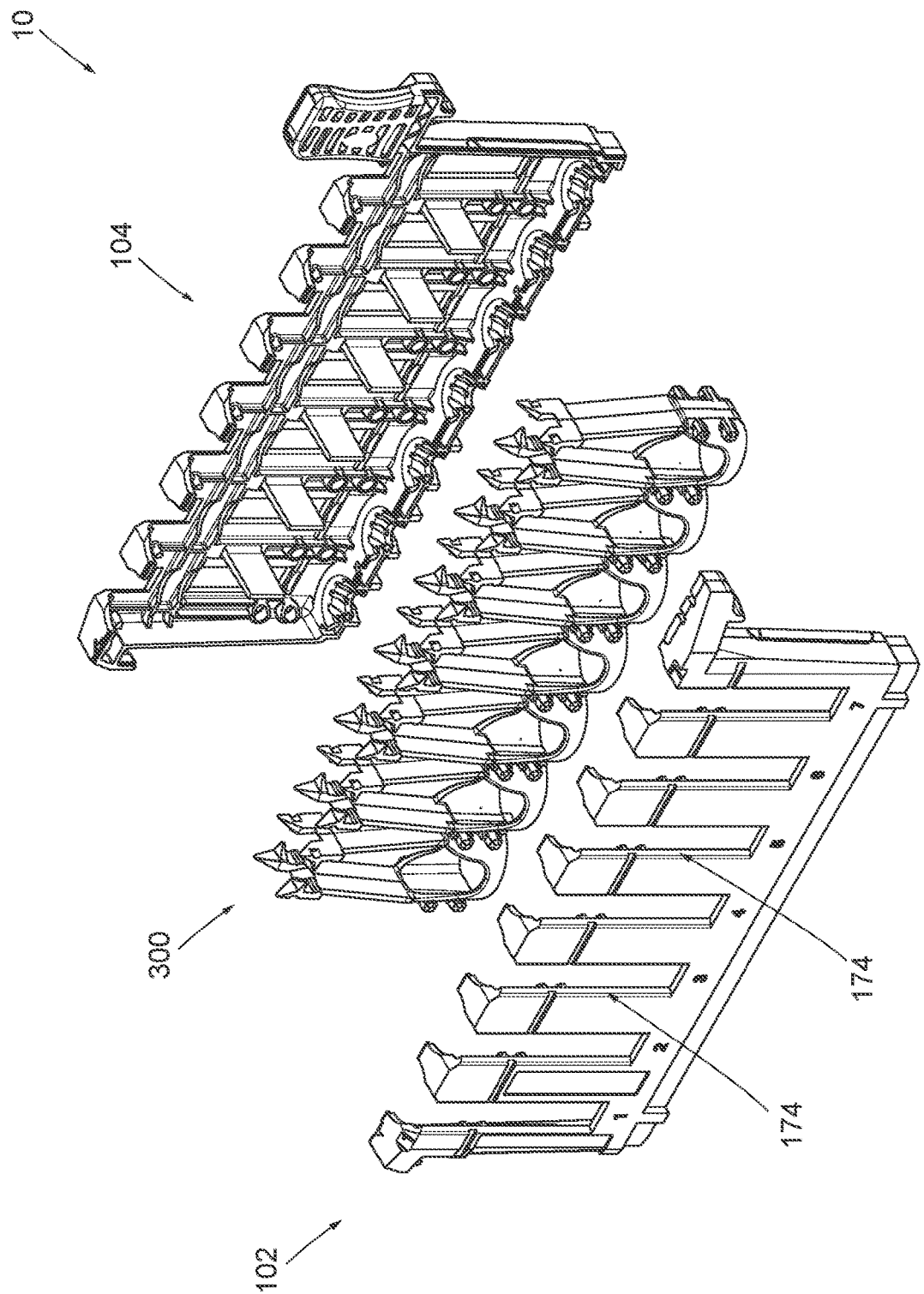
FIG. 3 depicts an exploded perspective view of the rack of FIG. 1.

Referring to FIGS. 1-3, rack (10) comprises housing (100) and clamp insert (300). Housing (100) comprises a front portion (102) and a rear portion (104) that are connectable together. Clamp insert (300) is installed between front portion (102) and rear portion (104). In one example, both housing (100) and clamp insert (300) are molded components that are separately molded and then fit together after molding. In view of the teachings herein, other ways to manufacture and assemble rack (10) will be apparent to those of ordinary skill in the art.

A. Handle

As shown in FIG. 1, rack (10) comprises handle (106). In the present example, handle (106) is formed as part of housing (100), but in some examples handle (106) may be formed separately and then connected with housing (100). Handle (106) extends from housing (100) in an upward direction away from a base (108) of rack (10). Handle (106) comprises gripping features (110). In the present example, gripping features (110) comprise a plurality of bores that extend through handle (106). Handle (106) comprises a concave front surface (114) and a concave rear surface (116). As illustrated, the plurality of bores extend through handle (106) from front surface (114) to rear surface (116).

Handle (106) further comprises a recessed area (118) along a top portion of handle (106). Recessed area (118) is configured as a location to receive a label. Such a label may indicate the type of rack, the type of tests being performed, sample information, etc. In view of the teachings herein, the various types of information suitable for use with a label positioned in recessed area (118) will be apparent to those of ordinary skill in the art.

Figure 9:
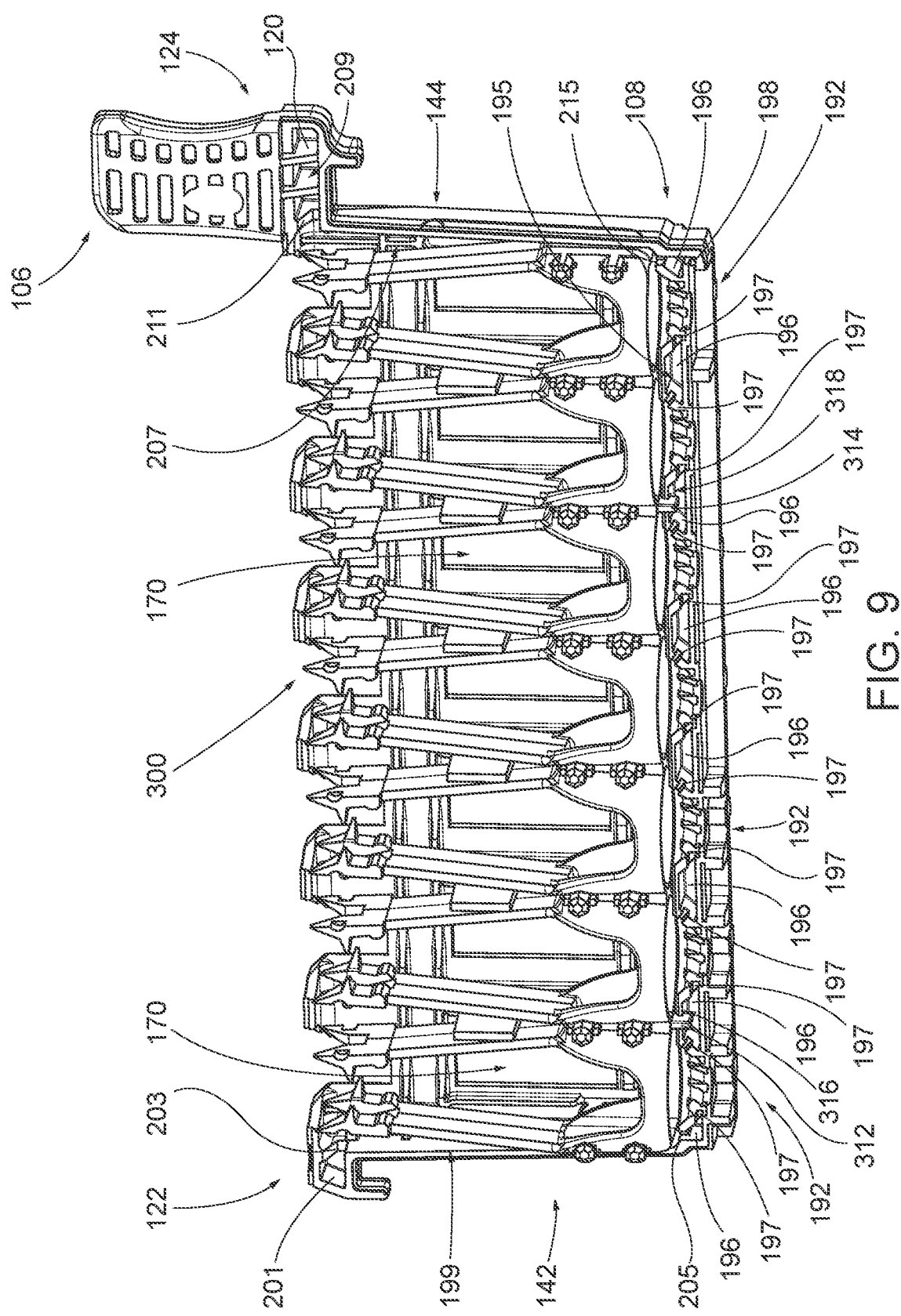
FIG. 9 depicts perspective view of the rack of FIG. 1, shown with part of the housing removed to reveal internal components.

As mentioned, handle (106) is formed as part of housing (100). In the present example, handle (106) is molded as a part of rear portion (104) of housing (100). In some other versions, rack (10) may be modified such that handle (100) is molded as part of front portion (102). Handle (106) further comprises gussets (120), as shown in FIG. 9, that extend downward at an angle and are configured to reinforce the connection of handle (106) with rear portion (104).

B. Hooks

Housing (100) also comprises hooks (122, 124). Hooks (122, 124) are formed as parts of housing (100). In particular, a first portion of hooks (122, 124) are formed in front portion (102) of housing (100), with a second portion of hooks (122, 124) are formed in rear portion (104). With this configuration, when front portion (102) and rear portion (104) are assembled to form housing (100), hooks (122, 124) are formed completely. Hooks (122, 124) define respective void spaces (126, 128), which are configured to receive a rail or other member of a rack handling system to support rack (10).

Hooks (122, 124) comprise respective fins (130, 132) extending downward toward base (108). Referring to FIGS. 5-8, each fin (130, 132) comprises respective chamfers (134, 136) along an inside surface of each fin (130, 132) facing toward rack (10). In the illustrated version of FIG. 6, fin (130) comprises two chamfers (134). Similarly, in the illustrated version of FIG. 8, fin (132) comprises two chamfers (136). Between each chamfer (134) of fin (130) and between each chamfer (136) of fin (132), fins (130, 132) comprise respective sections (138, 140). In some examples, sections (138, 140) comprise a chamfer as well, while in other examples, sections (138, 140) may be straight. With this configuration, fins (130, 132) are configured to be positionable along one side of the rail or other supportive members of a rack handling system. Chamfers (134, 136) aid in quickly locating or positioning rack (10) on such rails or other supportive members of a rack handling system as chamfers (134, 136) act or function as guides to guide the rack (10) into position with or engagement with such rails or other supportive members of a rack handling system.

Rack (10) comprises ends (142, 144) that are formed with housing (100), and each end (142, 144) defines a portion of respective hooks (122, 124). Referring to FIGS. 5-8, each end (142, 144) comprises respective chamfers (146, 148) along an outside surface of each end (142, 144) facing away from rack (10). In the illustrated version of FIG. 5, end (142) comprises two chamfers (146). Similarly, in the illustrated version of FIG. 7, end (144) comprises two chamfers (148). Between each chamfer (146) of end (142) and between each chamfer (148) of end (144), ends (142, 144) comprise respective sections (150, 152). In some examples, sections (150, 152) comprise a chamfer as well, while in other examples, sections (150, 152) may be straight. With this configuration, ends (142, 144) are configured to be positionable along one side of the rail or other supportive members of a rack handling system. Chamfers (146, 148) aid in quickly locating or positioning rack (10) on such rails or other supportive members of a rack handling system as chamfers (146, 148) act or function as guides to guide the rack (10) into position with or engagement with such rails or other supportive members of a rack handling system.

Hook (122) further comprises a nose portion (154) that extends upward from fin (130) at an angle. This angled nose portion (154) comprises another chamfer that is configured to aid in lifting rack (10) away from the rails or other supportive members of a rack handling system. For instance, in some rack handling systems, multiple racks (10) may be installed in close proximity to one another. Providing angled nose portion (154) allows rack (10) to be lifted upward by handle (106). The lifting of handle (106) tilts rack (10) toward end (142). Because of angled nose portion (154), clearance is provided such that rack (10) is prevented from contacting or obstructing another rack that may be installed or positioned adjacent to end (142) of rack (10).

Hooks (122, 124) further comprise lead-in chamfers (160, 162) along each side of each respective hook (122, 124). In particular, hook (122) comprises chamfers (160) along each side, while hook (124) comprises chamfers (162) along each side. Chamfers (160, 162) provide hooks (122, 124) with an angled configuration such that hooks (122, 124) narrow as they extend away from a centerline of rack (10) or outward from rack (10). Chamfers (160, 162) are configured such that they guide rack (10) when transported to align rack within a transport or rack handling system to keep rack (10) properly positioned. For instance, when rack (10) is transported or moved in a direction parallel with a longitudinal axis of rack (10), should rack (10) contact any structures of the rack handling system during movement, chamfers (160, 162) will direct rack (10) back into alignment or a proper position within the rack handling system by contacting such structures of the rack handling system. In view of the teachings herein, other features that may be used with rack (10) or hooks (122, 124) of rack (10) to aid in handling and transport will be apparent to those of ordinary skill in the art.

C. Interlocking Bar and Groove

Referring to FIGS. 1 and 2, rack (10) further comprises a longitudinally extending groove (156) along front portion (102) of housing (100). Additionally, rack (10) comprises a longitudinally extending bar (158) along rear portion (104) of housing (100). Note that in some versions, groove (156) may instead be positioned along rear portion (104) with bar (158) positioned along front portion (102). When multiple racks (10) are used, bar (158) of one rack (10) cooperates with groove (156) of an adjacent rack (10). In particular, bar (158) and groove (156) of adjacent racks (10) are cooperating features, where bar (158) engages groove (156) to provide a selective connection between adjacent racks (10). In this manner of engagement, rack (10) comprises bar (158) positioned along one side of housing (100) and groove (156) positioned along an opposite side of housing (100), wherein groove (156) has a depth and a height that corresponds with a width and a height of bar (158). By way of example only, and not limitation, when three or more racks (10) are held next to one another, with one or more racks (10) sandwiched between outer or end racks (10), the engagement of adjacent bars (158) and groove (156) prevents otherwise unsupported racks (10) in the middle from falling out of the middle of the stacked racks (10).

While in the present example, grooves (156) and bars (158) are shown and described as features of rack (10), in some instances racks other than rack (10) can be configured with the same or similar grooves (156) and bars (158). Similarly, grooves (156) and bars (158) of these other racks may be located at a same distance from a bottom of the respective racks such that these cooperating features may work together across different rack designs.

In the present example, one aspect of groove (156) and bar (158) is that their longitudinally extending configuration provides support for engaged adjacent racks along substantially the entire length of the racks, or at least support is provided along a majority of the length of the racks. Of course in other versions, groove (156) and/or bar (158) are not required to extend longitudinally substantially the length of rack (10), and instead may extend only partially along rack (10) or only in certain locations along rack (10).

While in the present example, the cooperating features of adjacent racks are shown and described as grooves (156) and bars (158), in other examples grooves (156) and bars (158) can be modified or replaced with other structures that provide the same or similar function. Such other structures or features will be apparent to those of ordinary skill in the art in view of the teachings herein.

D. Recessed Identification Areas

Referring again to FIG. 1, rack (10) comprises recessed area (164) formed along a corner of housing (100). Recessed area (164) is configured as a wrap-around area, where recessed area (164) extends continuously around a corner (101) of housing (100) such that recessed area (164) is viewable from two sides of housing (100). In the present example, recessed area (164) is viewable from front portion (102) of housing (100), and recessed area (164) is viewable from end (142) of housing (100). In other versions, recessed area (164) may be located on another corner of rack (10), or multiple recessed areas (164) may be located on multiple corners of rack (10). Another way to describe recessed area (164) is that recessed area (164) is presented continuously, or in an uninterrupted manner, along two perpendicularly oriented surfaces of rack (10).

Recessed area (164) is configured to receive a label containing identifying or other information. The recessed nature of recessed area (164) allows for the label to be slightly recessed or set back from the remaining outer surface of housing (100). In this manner, the attached label is protected from contact with the rack handling system, or such contact is lessened, and the attached label is subject to less wear and tear during use of rack (10). Also, with recessed area (164) presenting on two sides of housing (100), the information contained on the label attached with recessed area (164) is viewable or accessible for view from two sides of rack (10). In an example where the label contains a barcode or other scannable graphic or text, the scannable feature may wrap the corner of housing (100) and thus the same label may be scannable from multiple sides of the rack (10).

In some examples, recessed area (164) is configured to receive one or more labels, and such labels are attachable with recessed area (164) by way of adhesives that may include tape or glue, magnets, static electricity or charge, suction, etc. In some instances, labels attached with recessed area (164) are selectively attached such that the labels are removable.

As shown in FIG. 1, an additional recessed area (166) can be provided with front portion (102) of housing (100). Recessed area (166) is not required in all versions, and neither would recessed area (164) be required in all versions for that matter. Recessed area (166) may be configured to receive a label as described above. In some instances either of recessed areas (164, 166) can include calibration information concerning rack (10), tests being performed, and/or samples contained by rack (10). In view of the teachings herein, other ways to configured recessed areas (164, 166), as well as recessed area (118) of handle (106), and use such areas will be apparent to those of ordinary skill in the art.

E. Windows and Indicia

Figure 4:
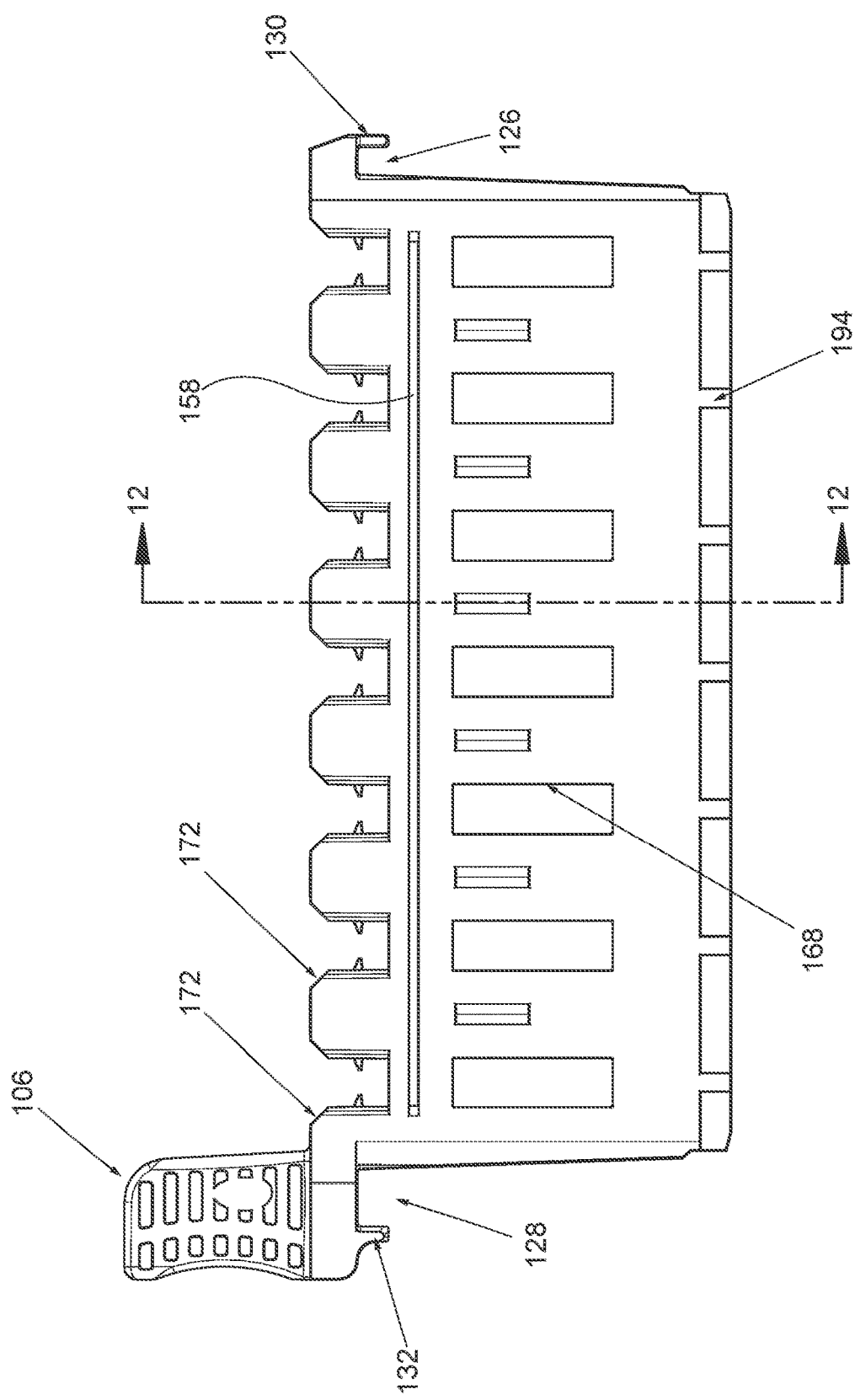
FIG. 4 depicts a rear elevation view of the rack of FIG. 1.
Figure 5:
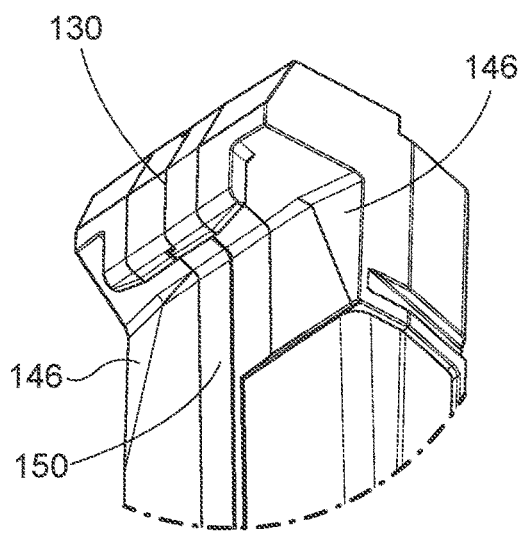
FIG. 5 depicts a partial perspective view of a side portion of the rack of FIG. 1.
Figure 7:
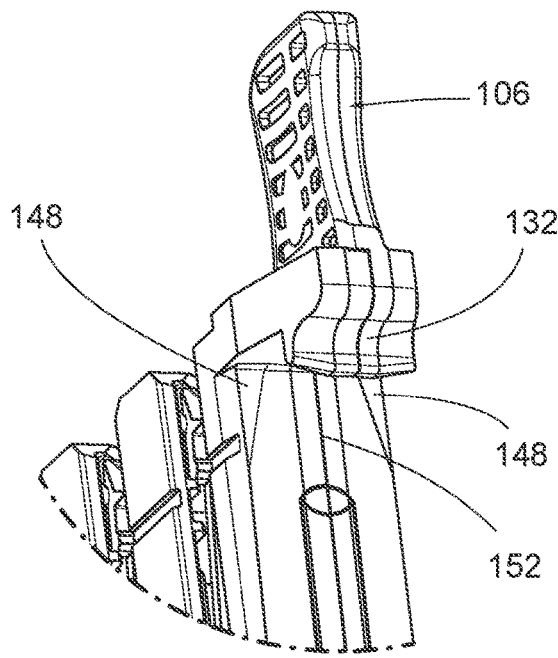
FIG. 7 depicts a partial perspective view of another side portion of the rack of FIG. 1.
Figure 6:
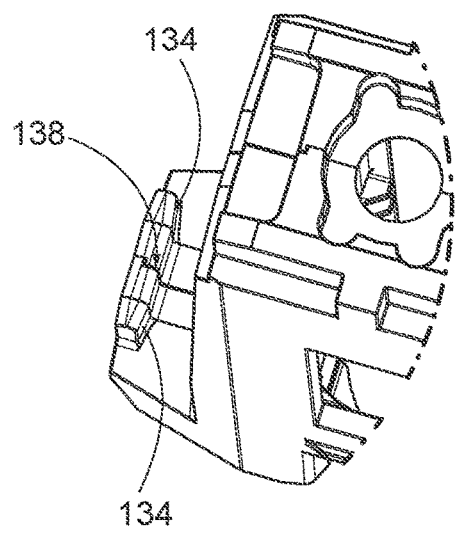
FIG. 6 depicts a partial perspective view of the side portion of the rack of FIG. 5.
Figure 8:
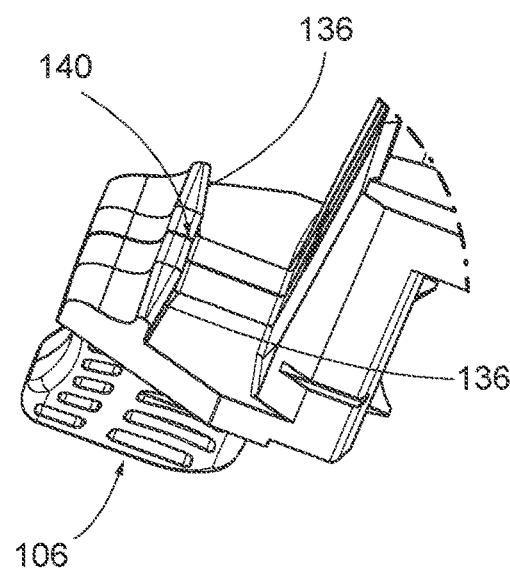
FIG. 8 depicts a partial perspective view of the side portion of the rack of FIG. 7.

Rack (10) includes other visual features, one of which is viewing apertures (168) located along rear portion (104) of housing (100) as shown in FIGS. 2 and 4. Apertures (168) are positioned along rear portion (104) such that they align with the spaces or compartments (170) for receiving the sample tubes through openings (171) of the spaces or compartments (170). In this way, from the rear or backside of rack (10), a sample tube retained within one of spaces or compartments (170) is viewable through the associated aperture (168). In some instances, the one or more sample tubes may have labels with or without barcodes or other scannable features. Apertures (168) provide for a location for viewing such labels, viewing sample contained within a sample tube, and/or scanning a barcode or other scannable feature on the sample tube itself or a label affixed to the sample tube.

With rack (10), each space (170) is at least partially defined by a respective U-shaped notch (172) in rear portion (104) of housing (100) as shown in FIGS. 2 and 4. Notches (172) are generally positioned above apertures (168) such that an area of housing (100) separates apertures (168) from notches (172). On front portion (102), each space (170) is at least partially defined by a respective elongated U-shaped notch (174) as shown in FIG. 1. Notches (174) align across from notches (172) and apertures (168). Similar to as described above with apertures (168), notches (172, 174) provide for another location for viewing labels of sample tubes, viewing samples contained within sample tubes, and/or scanning a barcode or other scannable feature on the sample tubes themselves or labels affixed to the sample tubes. With the configuration described above, notches (172, 174) provided for finger gripping of the sample tubes that may be positioned within spaces (170) of rack (10). While the present example shows notches (172, 174) as having U-shapes or elongate U-shapes, in view of the teachings herein, other shapes for notches (172, 174) will be apparent to those of ordinary skill in the art.

Rack (10) further includes certain indicia to assist in the use of rack (10). For instance, rack (10) includes a direction arrow (176) at end (142). In the present example as shown in FIG. 1, arrow (176) is located along a top surface of hook (122) and on the opposite end of rack (10) to where handle (106) is positioned. Arrow (176) is configured to communicate to a user the proper way to install rack (10) within a rack handling system.

Rack (10) further includes a graphic (178) as seen in FIG. 2. Graphic (178) is configured to communicate to the user the type of sample container compatible for use with rack (10). In the present example, graphic (178) has the form of a sample tube style sample container. Thus in the present example graphic (178) is configured to communicate to a user that rack (10) is compatible and/or usable with at least sample containers comprising sample tubes. In some versions, and as mentioned above, rack (10) may be compatible for use with sample tubes and/or sample cups. In those instances, graphic (178) may remain unchanged, or graphic (178) can be altered to include a sample cup style container in addition to or instead of the sample tube style sample container. As will be discussed further below, other racks exist where graphic (178) has the form of a sample cup style container and the rack is particularly configured for use with sample cups.

As shown in FIG. 2, graphic (178) is located on end (144) of housing (100). Thus, graphic (178) is located on the same end of housing (100) as is handle (106). By locating graphic (178) on the same end of housing (100) as handle (106), a user may easily observe or check the rack type being picked up to ensure that the desired rack style is selected—sample tube style compatible or sample cup style compatible. In view of the teachings herein, other forms and placements for graphic (178) of rack (10) will be apparent to those of ordinary skill in the art.

Rack (10) further comprises position indicators (180) that correspond with spaces (170) within rack (10). For instance, as shown in FIG. 1, rack (10) comprises seven spaces (170) for receiving sample tubes and/or sample cups. Position indicators (180) are configured as numeric characters that are located along front portion (102) of housing (100) just beneath elongated U-shaped notches (174). Additionally, rack (10) comprises position indicators (182) that are located along a top surface of front portion (102) of housing (100) as shown in FIG. 1. In the present example, position indicators (182) are located at each end of front portion (102). Furthermore, a portion of the top surface of front portion (102) at each end comprises an angled surface (184) and position indicators (182) are located on angled surfaces (184). With this configuration, position indicators (182) are viewable from the top of rack (10) as well as from the front of rack (10). Additionally, position indicators (182) are configured as numeric characters, with position indicator (182) closest to end (142) indicating a first space or position within rack (10), while position indicator (182) closed to end (144) indicating a seventh space or position within rack (10). In view of the teachings herein, other ways to incorporate viewing features—such as apertures (168) and notches (172, 174)—and indicia—such as arrow (176), graphic (178), and position indicators (180, 182)—into rack (10) will be apparent to those of ordinary skill in the art.

F. Base Features

As mentioned above, rack (10) comprises base (108). FIG. 2 shows base (108), which comprises longitudinally extending beams (186). In the present example, beams (186) are formed as part of housing (100) such that one of beams (186) is formed as part of front portion (102) and another of beams (186) is formed as part of rear portion (104). As shown in the example of FIG. 2, beams (186) extend nearly the full the length of rack (10), but in other versions beams (186) may extend less than nearly the full length. Together, beams (186) are configured as the bottom surface upon which rack (10) sits when placed on a surface in an upright orientation.

Base (108) further comprises transversely extending dividers (188). At each end of each divider (188), divider (188) connects with beams (186). Beams (186) and dividers (188) together define recesses (190) within base (108). In the present example, some of recesses (190) comprise rectangular shapes. Still other recesses (190) comprise circular-like shapes. Dividers (188) are slightly recessed relative to beams (186) in the present example of FIG. 2. This slight recessing of dividers (188) compensates for imperfections that can occur with the flatness of molded parts. By recessing dividers (188) slightly relative to beams (186), stability can be improved by avoiding a circumstance where an imperfectly flat molded divider (188) may otherwise contact a surface upon which rack (10) is placed instead of or in addition to beams (186) contacting that surface. Without such recessing, an imperfectly flat molded divider (188) may introduce a rocking phenomenon when standing rack (10) on a surface.

In the illustrated example, two rectangular recesses (190) within base (108) are configured to engage with features of a rack handling system to control movement of rack (10). For instance, rectangular recess (190) nearest end (144), and rectangular recess (190) between first and second spaces (170) from end (142) are configured to engage with features of a rack handling system. In other versions, other recesses (190) may be configured to engage with features of a rack handling system instead of or in addition to those recesses (190) described above. In the present example, recesses (190) described above for controlling rack (10) movement may be referred to as engagement features or stop features for engaging a lever member in a rack handling system. In view of the teachings herein, other various ways to configure one or more recesses (190) to cooperate with features of a rack handling system to control movement of rack (10) will be apparent to those of ordinary skill in the art.

In some other versions, base (108) of rack (10) can be configured with magnets. Such magnets may be located within one or more openings (192) within base (108). Such magnets can be used with features of a rack handling system to help control movement of rack (10). For instance magnetic features of a rack handling system could establish a selective connection with the magnets of the rack (10) to control movement of rack (10). In other instances, sensors within a rack handling system may be used to detect magnets within rack (10) as a way of indexing the position of rack (10) within the rack handling system. While in the illustrated example, magnets are not required, in view of the teachings herein, those of ordinary skill in the art will understand various ways magnets may be incorporated with and used with rack (10).

Base (108) of rack (10) further comprises column features (194) on front portion (102) and rear portion (104). In the present example, there are two column features (194) located along base (108) of front portion (102) as seen in FIG. 1. Furthermore, there are seven column features (194) located along base (108) of rear portion (104) as seen in FIG. 4. With rear portion (104), each column feature (194) aligns with one of spaces (170) configured to receive a sample container, such as a sample tube. In this manner, column features (194) on rear portion (104) may be used to index the location of the sample containers. For example, column features (194) of rear portion (104) can be used in a rack handling system to stop rack (10) at each space (170) coinciding with a sample tube's position. In a rack handling system, the two column features (194) of front portion (102), can be used to push or pull rack (10) in transfer lanes of the rack handling system. Note that use of column features (194) is not required in all versions. In some instances one rack handling system may be configured to move and handle rack (10) based on column features (194). In some other instances, another rack handling system may be configured to move and handle rack (10) based on one or more recesses (190) as described above. And still in other instances a rack handling system may be configured to move and handle rack (10) based on a combination of one or more recesses (190) and one or more column features (194). In view of the teachings herein, other ways to configure rack (10) and those systems that handle racks (10) will be apparent to those of ordinary skill in the art.

G. Passage for Drainage and Venting

Figure 13:
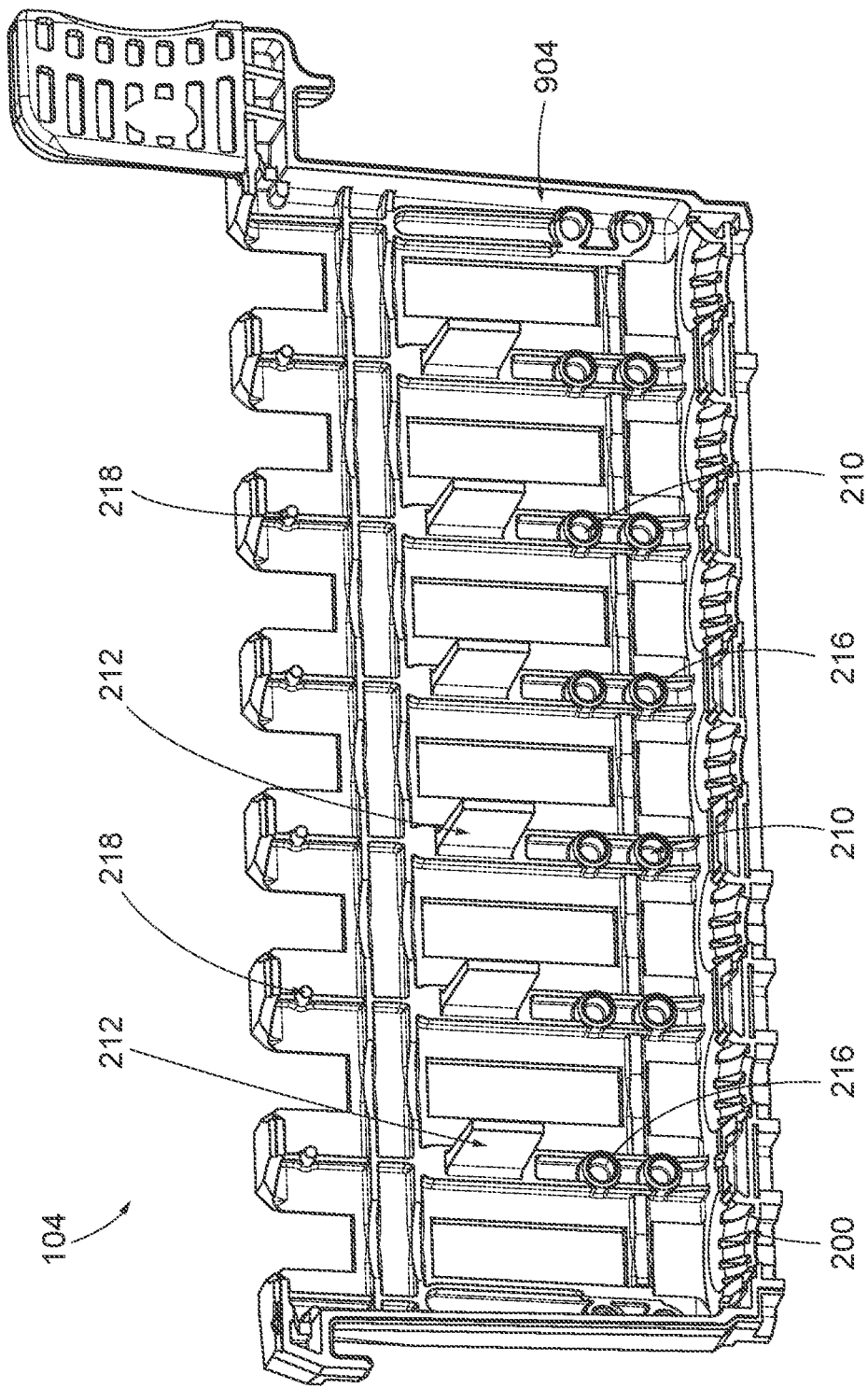
FIG. 13 depicts a perspective view of a rear portion of a housing of the rack of FIG. 1.
Figure 14:
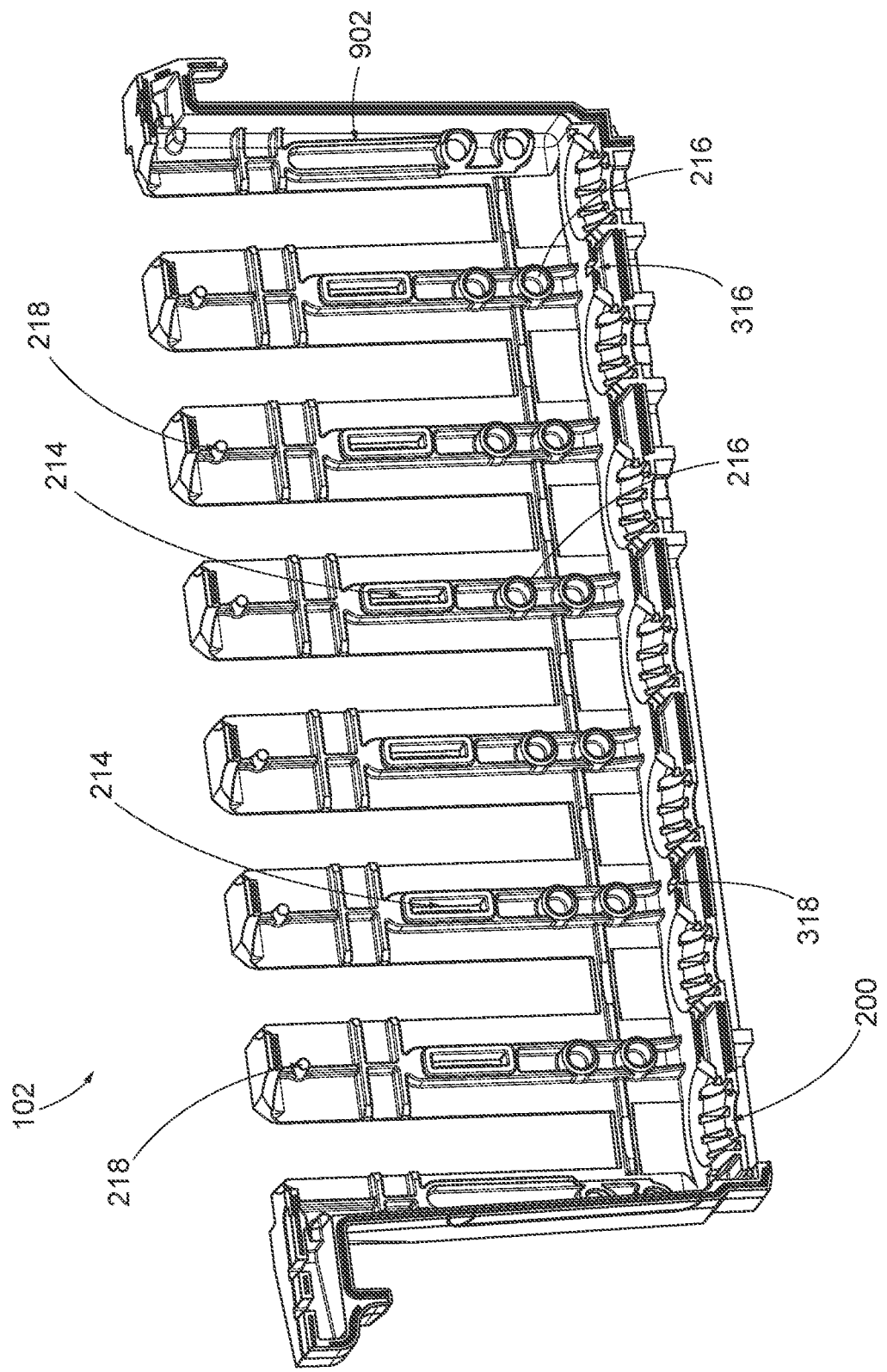
FIG. 14 depicts a perspective view of a front portion of the housing of the rack of FIG. 1.

Rack (10) comprises housing (100) and clamp insert (300) as mentioned above. FIG. 13 shows rear portion (104) of housing (100), while FIG. 14 shows a front portion (102) of housing (100). FIG. 9 shows a perspective view with rear portion (104) removed to show clamp insert (300) located within. Front and rear portions (102, 104) define a passage (195), which facilitates drainage and venting rack (10), e.g. drainage of water or other cleaning fluid that may otherwise collect within rack (10) during clean or immersion for cleaning. In the present example, passage (195) extends longitudinally along an internal region of housing (100) just above base (108) from end (142) to end (144), and through spaces (170) in between. Passage (195) is comprised of cavities (196) that are located at ends (142, 144) and between spaces (170). Cavities (196) connect with the bottom of each space (170) by openings (197). Openings (197) create access to cavities (196) for improved draining and venting compared to cavities that may otherwise being completely or substantially closed. Furthermore, openings (192) of each space (170) fluidly connect with passage (195) thereby providing additionally outlets for drainage and inlets for venting. In this manner, any liquid contained within rack (10) can drain from openings (192). Similarly, passage (195) is configured as a vent that permits airflow through rack (10), which promotes drying. With the present configuration where rack (10) comprises passage (195) as described above, not only is drainage and drying aided, but also rack (10) is configured such that fluid is prevented from becoming trapped within rack (10) because of the lack of closed or substantially closed cavities or pockets within rack (10).

In addition to passage (195), another passage (199) extends vertically along an interior of end (142). Passage (199) comprises cavity (201) within hook (122). Opening (203) connects cavity (201) with an interior of rack (10) such that cavity (201) is not closed off. Passage (199) connects with passage (195) described above near the bottom of rack (10). In particular, cavity (196) at end (142) includes opening (205) that fluidly connects passage (199) with passage (195). Passage (199) also fluidly connects with opening (192) of space (170) nearest end (142).

In addition to passages (195, 199) described above, another passage (207) extends vertically along an interior of end (144). Passage (207) comprises cavity (209) formed within hook (124). Opening (211) connects cavity (209) with an interior of rack (10) such that cavity (209) is not closed off. Furthermore, openings (213) connect cavity (209) with an exterior of rack (10) along top of hook (124) near handle (106) as seen in FIG. 1. Passage (207) connect with passage (195) described above near the bottom of rack (10). In particular, cavity (196) at end (144) includes opening (215) that fluidly connects passage (207) with passage (195). Passage (207) also fluidly connects with space (170) nearest end (144) below opening (192) by way of opening (198) that is formed in cavity (196) at end (144). With the above described configuration for passages (195, 199, 207), rack (10) is configured to avoid trapping water or cleaning fluid within rack (10) by way of a continuous drainage and venting channel or pathway within housing (100) of rack (10). In the present example, with the connecting arrangement of passages (195, 199, 207), rack (10) can further be considered to comprise a U-shaped drainage and venting channel or pathway.

H. Bottom Locators

Figure 11:
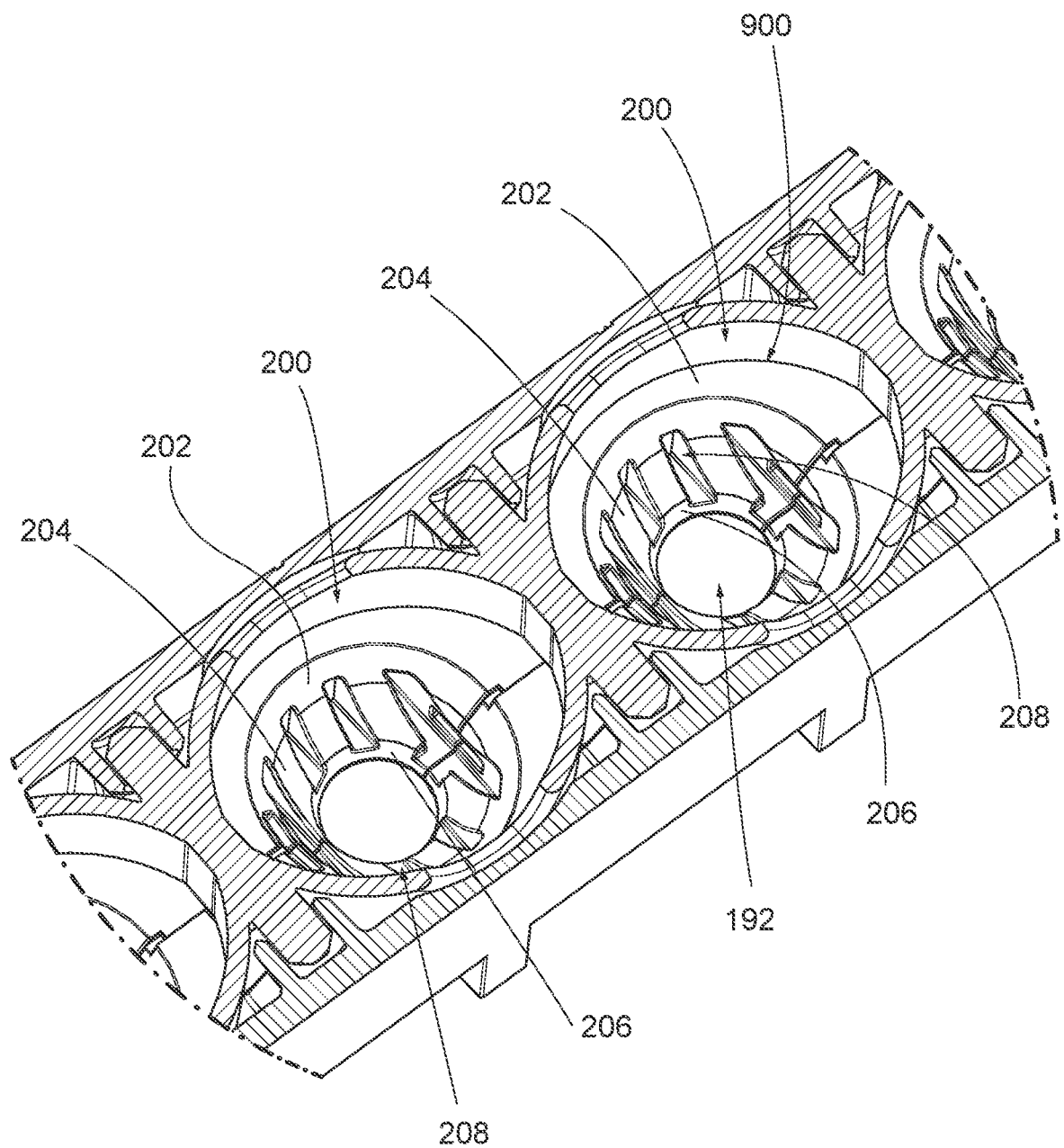
FIG. 11 depicts a cross section perspective view of the rack of FIG. 1, taken along line 11-11 of FIG. 4.
Figure 12:
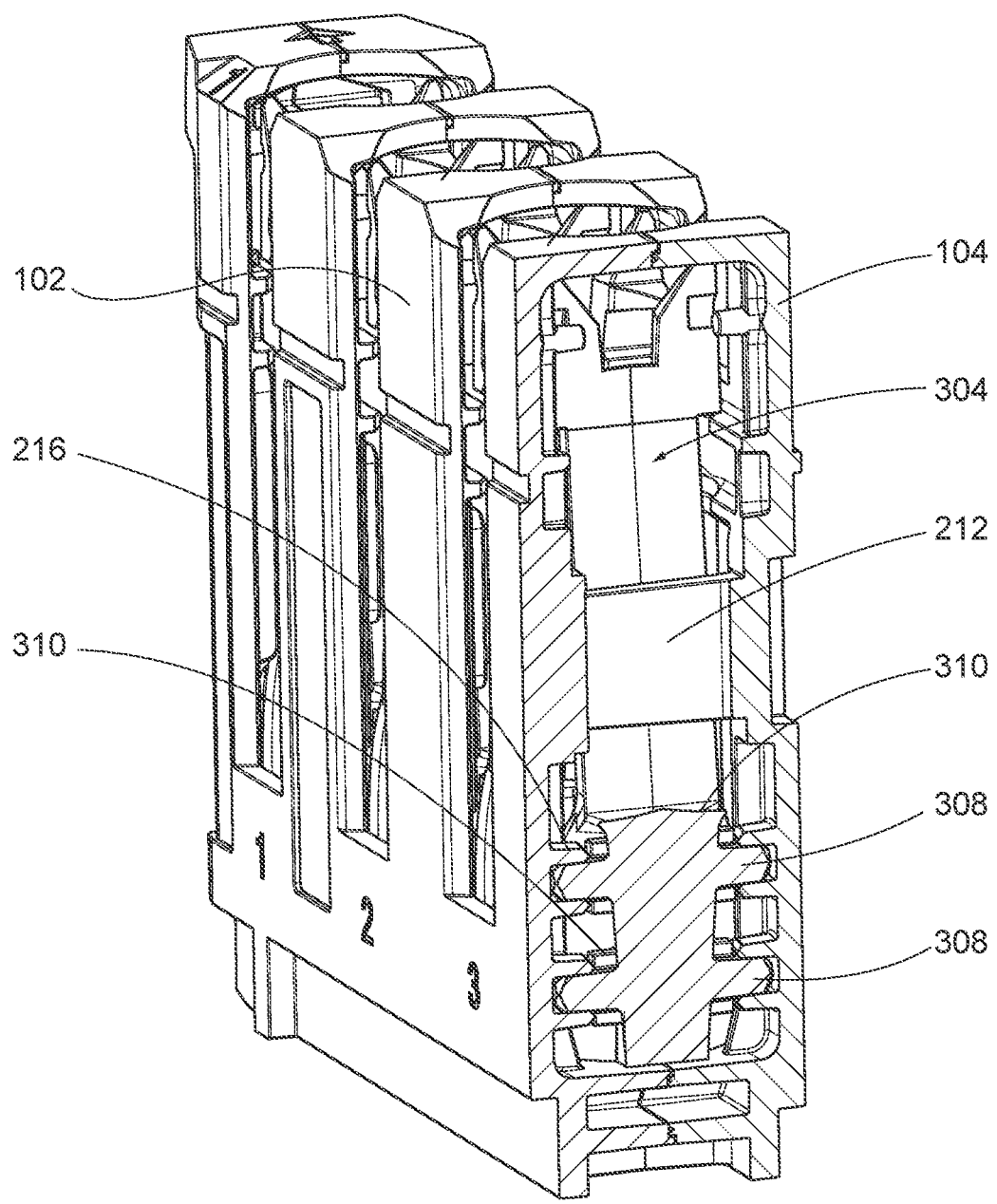
FIG. 12 depicts a cross section perspective view of the rack of FIG. 1, taken along line 12-12 of FIG. 4.

FIGS. 11 and 12 show cross sections of rack (10) that reveal bottom locators (200). Bottom locators (200) are configured to receive sample containers, and in particular sample tubes. Thus, bottom locators (200) define a bottom of each respective space (170) for receiving a sample tube. In the present example with seven spaces (170) within rack (10), there are seven corresponding bottom locators (200). In other versions of rack (10) there may be greater or fewer spaces (170) and bottom locators (200). Each bottom locator (200) comprises a multi-level configuration with a multi-level feature (900) as described further below. In the illustrated example, a bottom surface of each bottom locator (200) includes three locator areas (202, 204, 206) configured as circular curved surfaces. Each bottom locator (200) is configured as a universal tube bottom locator that is able to seat and/or locate sample tubes of multiple sizes and shapes.

Figure 15:
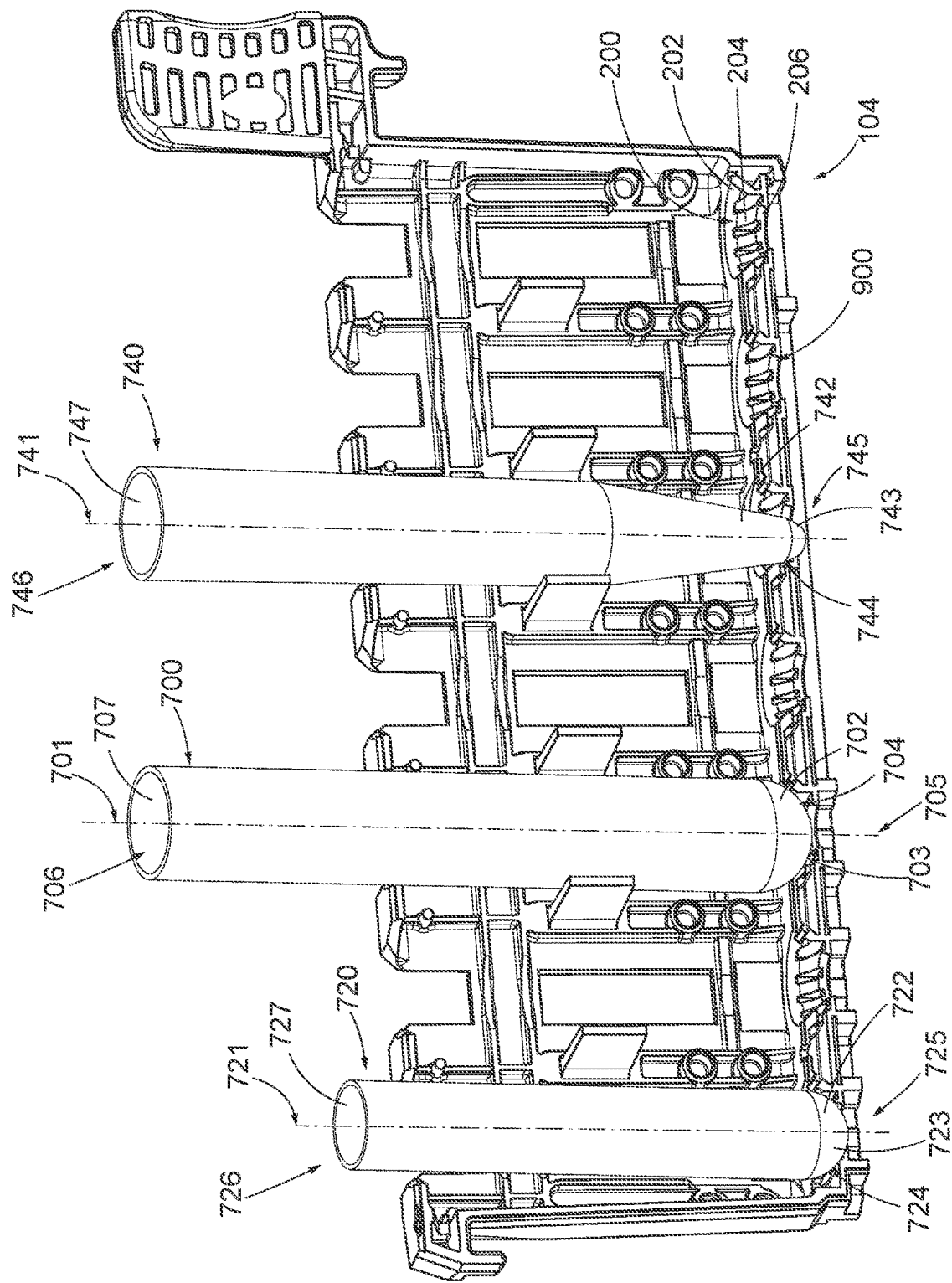
FIG. 15 depicts a perspective view of a rear portion of the housing of the rack of FIG. 1, showing various style test tubes positioned within the rack.

Referring to FIG. 15, by way of example only and not limitation, locator area (202) is an outer one of the locator areas and is configured for use with a sample tube (700). Sample tube (700) has a 15-16 millimeter outer diameter and comprises a first end (705) and a second end (706). First end (705) is closed and includes a bottom or end portion (702) having a hemisphere shape or radiused tip (703). Second end (706) includes an opening (707) configured to receive a sample. Sample tube (700) defines a longitudinal axis (701). Sample tube (700) has a height of about 75 millimeters to about 100 millimeters, but these heights are not required in all versions. Sample tube (700) may be revolved about longitudinal axis (701). Sample tube (700) may be symmetrical about its longitudinal axis (701)—axisymmetric—as shown, but in other versions sample tube (700) may be partially symmetrical or asymmetrical. Sample tube (700)

may be cylindrical, have a cylindrical portion, the cylindrical portion may have draft (to facilitate molding) and thus be conical, etc. Locator area (202) is configured with a circular curved surface that is complementary to at least a portion of the hemisphere shape of bottom (702) of sample tube (700). In this manner, an interface (704) is defined by at least a portion of bottom (702) of sample tube (700) and locator area (202) such that there is a common boundary between at least a portion of bottom (702) of sample tube (700) and locator area (202).

Still referring to FIG. 15, locator area (204) is configured for use with a sample tube (720). Sample tube (720) has a 12-13 millimeter outer diameter and comprises a first end (725) and a second end (726). First end (725) is closed and includes a bottom or end portion (722) having a hemisphere shape or radiused tip (723). Second end (726) includes an opening (727) configured to receive a sample. Sample tube (720) defines a longitudinal axis (721). Sample tube (720) has a height of about 75 millimeters to about 100 millimeters, but these heights are not required in all versions. Sample tube (720) may be revolved about longitudinal axis (721). Sample tube (720) may be symmetrical about its longitudinal axis (721)—axisymmetric—as shown, but in other versions sample tube (720) may be partially symmetrical or asymmetrical. Sample tube (720) may be cylindrical, have a cylindrical portion, the cylindrical portion may have draft (to facilitate molding) and thus be conical, etc. Locator area (204) is an intermediate one of the locator areas and is configured with a circular curved surface that is complementary to at least a portion of the hemisphere shape of bottom (722) of sample tube (720). In this manner, an interface (724) is defined by at least a portion of bottom (722) of sample tube (720) and locator area (204) such that there is a common boundary between at least a portion of bottom (722) of sample tube (720) and locator area (204).

Still referring to FIG. 15, locator area (206) is configured for use with a sample tube (740). Sample tube (740) comprises first end (745) and a second end (746). First end (745) is closed and includes a bottom or end portion (742) having a conical shape or radiused tip (743). Second end (746) includes an opening (747) configured to receive a sample. Sample tube (740) defines a longitudinal axis (741). Sample tube (740) has a height of about 75 millimeters to about 100 millimeters, but these heights are not required in all versions. Sample tube (740) may be revolved about longitudinal axis (741). Sample tube (740) may be symmetrical about its longitudinal axis (741)—axisymmetric—as shown, but in other versions sample tube (740) may be partially symmetrical or asymmetrical. Sample tube (740) may be cylindrical, have a cylindrical portion, the cylindrical portion may have draft (to facilitate molding) and thus be conical, etc. Locator area (206) is an inner one of the locator areas and is configured with a circular curved surface that is complementary to at least a portion of the conical shape of bottom (742) of sample tube (740). In this manner, an interface (744) is defined by at least a portion of bottom (742) of sample tube (740) and locator area (206) such that there is a common boundary between at least a portion of bottom (742) of sample tube (740) and locator area (206). Locator area (206) further connects with opening (192).

In the manner described, each bottom locator (200) is configured as a universal tube bottom locator that is configured for use with tubes having diameters in a range of about 12 millimeters to about 16 millimeters. This is so for tubes having rounded and conical bottoms as shown in FIG. 15. As shown and described in the present example, each bottom locator (200) comprises locator areas (202, 204, 206) positioned at different heights within base (108) of rack (10). In this manner, the upper locator area (202) is configured to seat and locate sample tubes like sample tube (700) with larger diameters compared to the middle locator area (204). Also, the lower locator area (206) is configured to seat and locate sample tubes like sample tube (740) with a bottom (742) having a conical shape where the sample tube diameter at the area of contact between the conical shape bottom (742) and locator area (206) is relatively small. In view of the teachings herein, other ways to configure bottom locators (200) for use with sample tubes (700, 720, 740) and sample tubes of other sizes will be apparent to those of ordinary skill in the art.

As shown in FIGS. 11 and 12, locator areas (202, 204, 206) define the multi-level feature (900) for a respective bottom locator (200), and are configured as circular curved surfaces that are arranged concentrically, but each having a different diameter. Furthermore, each such circular curved surface is arranged at varying heights relative to one another. Each bottom locator (200) also comprises slots (208) that extend across at least a portion of each circular curved surface. Slots (208) are configured to promote drainage and venting within spaces (170).

In some other versions, rack (10) may incorporate bottom locators (200) that have greater or fewer numbers of circular curved surfaces for receiving sample tubes. For instance, while the illustrated example shows a three-level configuration, other bottom locators (200) for rack (10) may have a two-level configuration, or a four-level configuration. In view of the teachings herein, other ways to configure bottom locators (200) will be apparent to those of ordinary skill in the art.

I. Clamp Insert

Referring to FIGS. 3 and 9, rack (10) comprises clamp insert (300). In the present example, clamp insert (300) comprises a molded component, although in other examples clamp insert (300) may be constructed as separate pieces fastened together. Clamp insert (300) comprises a plurality of clamps (302), each configured to selectively retain a sample container such as a sample tube or sample cup. In some instances clamps (302) may be referred to as tube holding stations. Each clamp (302) comprises a pair of arms (304) that together are operable to selectively retain the sample container. Arms (304) of each clamp (302) extend upward from a connection ring (306) that forms a base of each clamp (302). Together, connection rings (306) are configured to minimize the impact of dimension mismatch between clamp insert (300) and housing (100).

Between adjacent connection rings (306) are posts (308) that extend outward perpendicular to a longitudinal axis of clamp insert (300). In the present example, there are two posts (308) between each connection ring (306). There are also two posts (308) at the start of the first connection ring (306) and two posts (308) at the end of the last connection ring (306). Above and below each post (308) is a stop member (310). Posts (308) are configured to engage with front and rear portions (102, 104) of housing (100) as will be discussed further below. Stop members (310) are configured to contact front and rear portions (102, 104) of housing (100) to set a proper engagement between front and rear portions (102, 104) and posts (308), as will also be discussed further below.

Clamp insert (300) further comprises a first extension member (312) and a second extension member (314) as shown in FIG. 9. First extension member (312) is configured to engage with a first slot (316) within housing (100). Second extension member (314) is configured to engage with a second slot (318) within housing (100). The engagement of first and second extension members (312, 314) with respective first and second slots (316, 318) is configured to occur only when clamp insert (300) is properly aligned relative to housing (100). This ensures that when assembling rack (10), assembly can only occur if clamp insert (300) is positioned one way such that first extension member (312) aligns with and fits within first slot (316), and second extension member (314) aligns with and fits within second slot (318). In this manner, first and second extension members (312, 314) along with first and second slots (316, 318) are poka-yoke features. In some other versions, first and second extension members (312, 314) and first and second slots (316, 318) are configured such that clamp insert (300) may be installed within housing (100) in more than one orientation—for instance facing one direction or the other.

Figure 10:
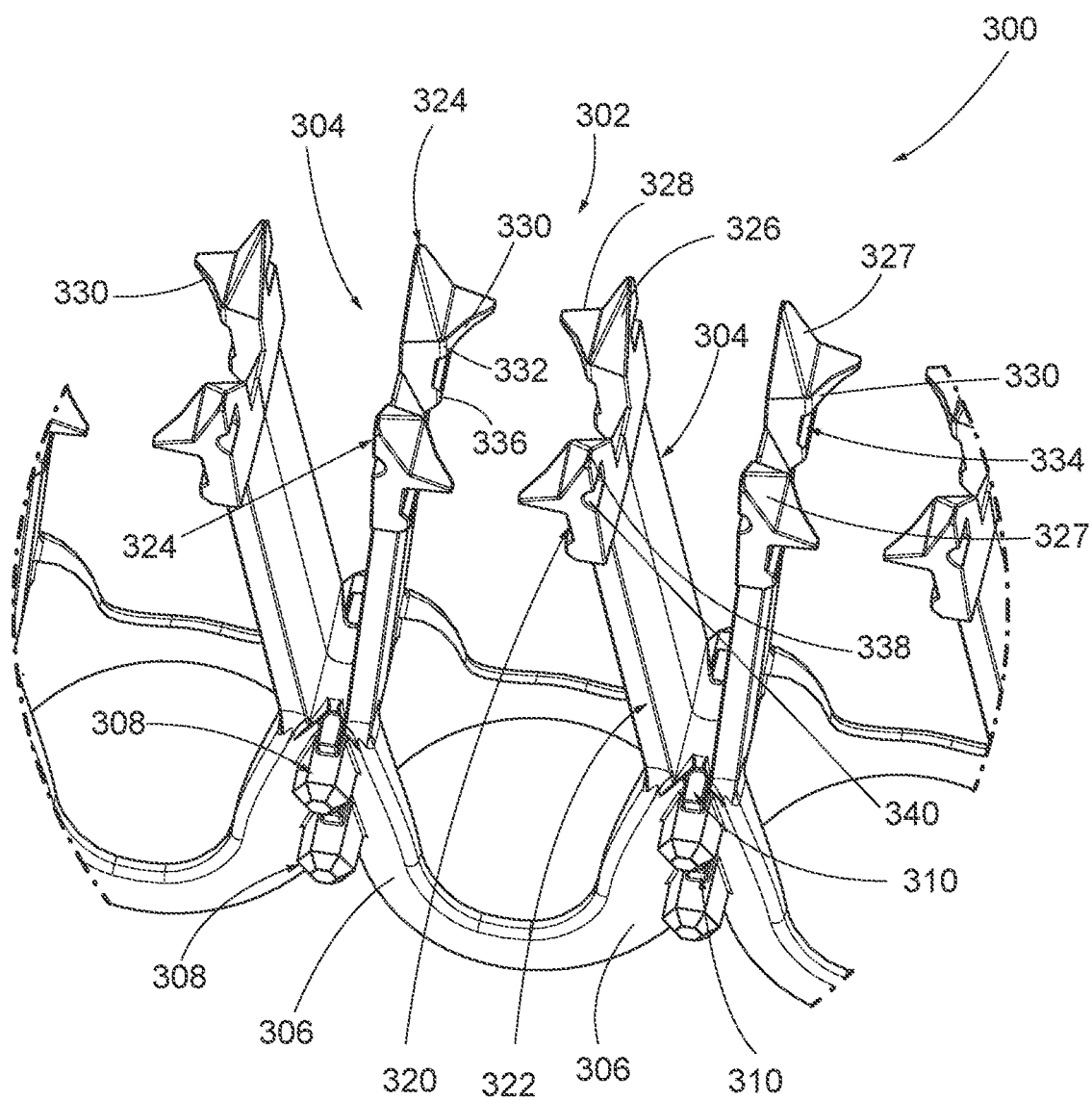
FIG. 10 depicts a partial perspective view of a clamp insert of the rack of FIG. 1.

Each arm (304) is resiliently configured such that each arm (304) is deflectable in order to accept or receive a sample container between arms (304) of clamp (302). FIG. 10 shows a closer view of a portion of clamp insert (300) to show additional features of arms (304). In particular, each arm (304) comprises a top portion (320) that connects with an elongated body portion (322). The elongated body portion (322) is formed with connection ring (306). Body portions (322) of each arm (304) of one of clamps (302) are angled inward toward a vertical axis defined by a center point of connection ring (306). With this configuration, arms (304) are naturally biased to assume this orientation as shown in FIG. 10. However, when holding a sample container, as mentioned, arms (304) of clamp (302) deflect away from each other to receive the sample container between arms (304) of clamp (302). In this manner, the mode or method of retaining sample containers with clamp (302) is passive while also being operable for use with different sized sample containers. In other words, no external actuation is required for retaining sample containers with clamp (302).

Top portion (320) of each arm (304) comprises dual retention members (324) configured to contact a sample container held within clamp (302). Each retention member (324) comprises an upward projection (326) and a lateral projection (328), with each projection (326, 328) having a pyramid shape. Upward projection (326) includes at least one angled surface portion (327) that is non-perpendicular to a longitudinal axis of a sample container, and the at least one angled surface portion (327) engages the end portion of the sample container when the end portion is inserted between the arms (304) of the clamp (302). Furthermore, the at least one angled surface portion (327) facilitates the spreading of the pair of opposing resilient arms (304) away from each other when the end portion of the sample container is inserted between the arms (304).

Lateral projections (328) comprises a self-centering feature (330), which comprises a curved surface positioned to contact and guide an inserted sample container. Each lateral projection (328) also comprises a corner (332) that is configured to provide contact with an inserted sample container to hold the sample container. Top portion (320) further comprises a shelf (334) having a corner (336) that generally aligns with corner (332) of lateral projection (328). With this configuration, each arm (304) having dual retention members (324) provides two self-centering features (330) and four corners (332, 336) that contact and hold an inserted sample container. In this manner, each arm (304) provides four points of contact for retaining an inserted sample container, where these four points of contact coincide with the four corners (332, 336) of each arm (304). As mentioned, each clamp (302) comprises two arms (304) arranged in an opposing orientation, and thus clamp (302) provides eight points of contact for supporting and retaining an inserted sample container. In some instances corners (332, 336) may be referred to herein as sample container engaging portions or points of contact.

Upward projections (326) of each retention member (324) comprises a pyramid shape as mentioned above. Each upward projection (326) comprises a guide feature or lead-in feature (338) configured to guide a sample container into position within clamp (302). In some instances lead-in feature (338) defines a chamfer. In the present example, lead-in feature (328) is configured as a diagonal surface defined by the intersection between two surfaces of upward projection (326). The diagonal surfaces guide the sample container during insertion within clamp (302) to locate the sample container in a centered fashion from a front side of clamp (302) to a rear side of clamp (302). As shown in FIG. 10, each diagonal surface lead-in feature (338) terminates at corner (332) of lateral projection (328). Thus, lead-in features (338) guide a sample container into proper alignment such that the sample container will contact four corners (332) of clamp (302).

As the sample container is inserted further, the resiliency and natural bias of arms (304) guide the sample container in a centered fashion from one end of clamp (302) to the other end of clamp (302). Also, self-centering features (330) further guide the sample container by the curved surfaces directing the sample container toward a center of clamp (302). As mentioned above, corners (336) provide additional points of contact between clamp (302) and the sample container to securely, yet selectively, retain the sample container within clamp (302). In this manner, self-centering features (330) further guide the sample container into proper alignment such that the sample container will also contact four corners (336) of clamp (302).

With the configuration of clamp (302) described above, clamp (302) comprises four points of contact at two longitudinal positions and enables longitudinal centering of sample containers including those long enough to contact bottom locator (200) and those sample containers that are not long enough or do not contact bottom locator (200). For example, centering can be achieved for both sample containers of the tube configuration and the cup configuration.

When clamp insert (300) is used to hold sample containers comprising sample tubes that extend at least the height of clamp (302), the features of clamp insert (300) described above cooperate with the features of bottom locators (200) described above. As discussed, both claim insert (300) and bottom locators (200) comprise features configured to self-center an inserted sample tube within rack (10). In this manner, sample tubes are supported in a self-centering manner at two regions within rack (10). For a given sample tube held within a given clamp (302) of clamp insert (300), the first of such regions includes top portions (320) of each arm (304) of clamp (302). The second of such regions includes bottom locator (200), which is aligned beneath clamp (302). Thus, when used with sample tubes, rack (10) provides self-centering support and guidance to the sample tubes from an upper and lower region of rack (10) as described above. Furthermore, the configuration of clamps (302), including the multiple points of contact described above, the resilient nature of arms (304), self-centering features (330), and lead-in features (338), promote maintaining inserted sample containers in a seated position within rack (10) where the bottom of the sample containers remain in contact with bottom locators (200).

Figure 19:
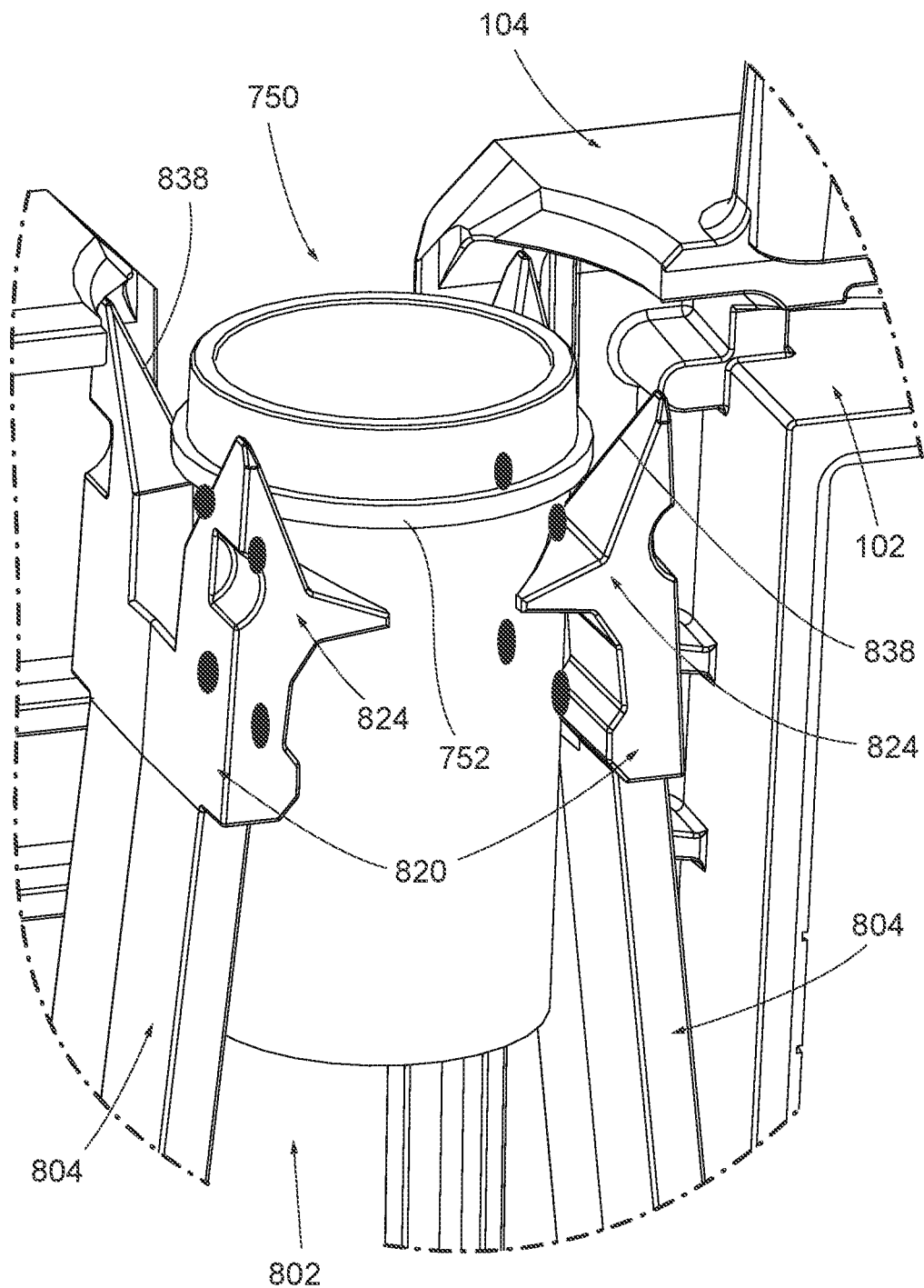
FIG. 19 depicts an enlarged perspective view of a portion of the rack of FIG. 1, showing the rack retaining an exemplary sample cup.

When clamp insert (300) is used to hold sample containers comprising sample cups, that do not extend the height of clamp (302), the features of clamp insert (300) described above provide the self-centering support and guidance to the sample cups. This is so because the sample cups do not have sufficient height to reach and contact bottom locators (200). In this manner, sample cups are supported in a self-centering manner at one region within rack (10). FIG. 19 shows a sample cup (750) held within a clamp (802) similar to clamp (302) of clamp insert (300). Clamp (802) is another exemplary version of clamp (302) as will be described further below. For the purposes of this discussion here, the features of clamps (302, 802) are the same. The region providing the self-centering includes top portions (820) of each arm (804) of clamp (802) as described above with respect to arms (304) of clamp (302). Thus, when used with sample cups, rack (10) provides self-centering support and guidance to the sample cups from an upper region of rack (10). Furthermore, as shown in FIG. 19, clamp (802) contacts sample cup (750) at eight points to securely hold sample cup (750) in place. Also, sample cup (750) comprises a flange (752) that protrudes from an outer surface of sample cup (750). Dual retention members (824) of each arm (804) engage an underside of flange (752) as shown in FIG. 19. Dual retention members (824) are similar to dual retention members (324) described above. More specifically, in the illustrated example of FIG. 19, lead-in features (838), similar to lead-in features (338) described above, contact and engage an underside of flange (752) to secure sample cup (750) within clamp (802).

As mentioned above, arms (304) of clamps (302) are resiliently biased such that arms (304) deflect when inserting a sample container within clamps (302). In the present example, arms (304) also conform to some degree to the inserted sample container. This compliance of arms (304) provides that both upper and lower points of contact simultaneously contact the sample container. As mentioned above, the four upper points of contact are where corners (332) contact the sample container, and the four lower points of contact are where corners (336) contact the sample container. For illustration purposes, these eight total points of contact are represented by a series of dots shown in FIG. 19. Compared to other clamps where arms may be rigid or semi-rigid, or otherwise not able to conform to some degree to the sample containers, the compliance of arms (304) adds at least one degree of freedom, e.g., through the bending of the arms (304). The bending of arms (304) is thus for both clamping, e.g., a first bending or deflecting, and the bending of arms (304) is also for compliance for multi-point contact, e.g., a second bending or deflecting. In some instances, this first and second bending or deflection of arms (304) may be superimposed or co-extensive with each other. This compliance feature to arms (304) provides for secure retention of sample containers, and can be especially beneficial for short sample containers that do not seat within bottom locators (200).

As shown in FIG. 9, clamp insert (300) is configured to fit within housing (100). In particular, clamp insert (300) connects with interiors of front and rear portions (102, 104) of housing (100). As discussed above, one connection between clamp insert (300) and housing (100) occurs between first and second extension members (312, 314) of clamp insert (300) and first and second slots (316, 318) of housing (100).

FIG. 12 shows the other connection mentioned above involving posts (308) of clamp insert (300). Posts (308), as described above, extend outward from clamp insert (300) toward both front and rear portions (102, 104) of housing (100). Each of front portion (102) and rear portion (104) of housing comprise bores (210) as shown in FIGS. 13 and 14. Bores (210) are configured to receive posts (308) of clamp insert (300) as shown in FIGS. 11 and 12. In the present example, posts (308) comprise a hexagonal profile. Bores (210) may have a corresponding hexagonal profile to receive posts (308); however, bores (210) are not required to have such a complementary hexagonal profile in all versions. In the present example for instance, bores (210) have a circular profile. Still yet, posts (308) are not required to have a hexagonal profile in all versions either. In view of the teachings herein, various shapes and configurations for posts (308) and bores (210) will be apparent to those of ordinary skill in the art.

Referring still to FIGS. 12-14, front and rear portions (102, 104) of housing also include features that connect directly. In particular, in the present example front portion (102) comprises fins (212), while rear portion (104) comprises slots (214) configured to receive fins (212). As shown in FIGS. 9 and 12, fins (212) extend through clamp insert (300) in a non-contacting manner and engage with slots (214). Additionally, in the present example, front and rear portions (102, 104) of housing (100) are welded together using ultrasonic welding about their respective perimeters. In some other versions, front and rear portions (102, 104) may be connected together using adhesives, fasteners, etc. In view of the teachings herein, various ways to weld or otherwise connect front and rear portions (102, 104) of housing (100) will be apparent to those of ordinary skill in the art.

As mentioned above, clamp insert (300) also comprises stop members (310) as seen in FIG. 10. Stop members (310) are configured to contact body portions (216) that define bores (210) as seen in FIG. 12. In this manner, stop members (310) are configured to define a minimum spacing between clamp insert (300) and the housing (100). In particular this minimum spacing is defined between clamp insert (300) and each of front and rear portions (102, 104) of housing (100). During assembly this minimum spacing maintained by stop members (310) provides that clamp insert (300) is installed within housing (100) in a centered fashion from the front of rack (10) to the rear or back of rack (10). As shown in FIG. 12, in the present example posts (308) and stop members (310) are formed together and are symmetrical about a longitudinal and transverse axes of posts (308). This symmetrical configuration and use of stop members (310) is one way to provide that posts (308) are inserted within bores (210) to the same extent on both front and rear portions (102, 104) of housing (100). In view of the teachings herein, other ways to assemble clamp insert (300) within housing (100) will be apparent to those of ordinary skill in the art.

Figure 16:
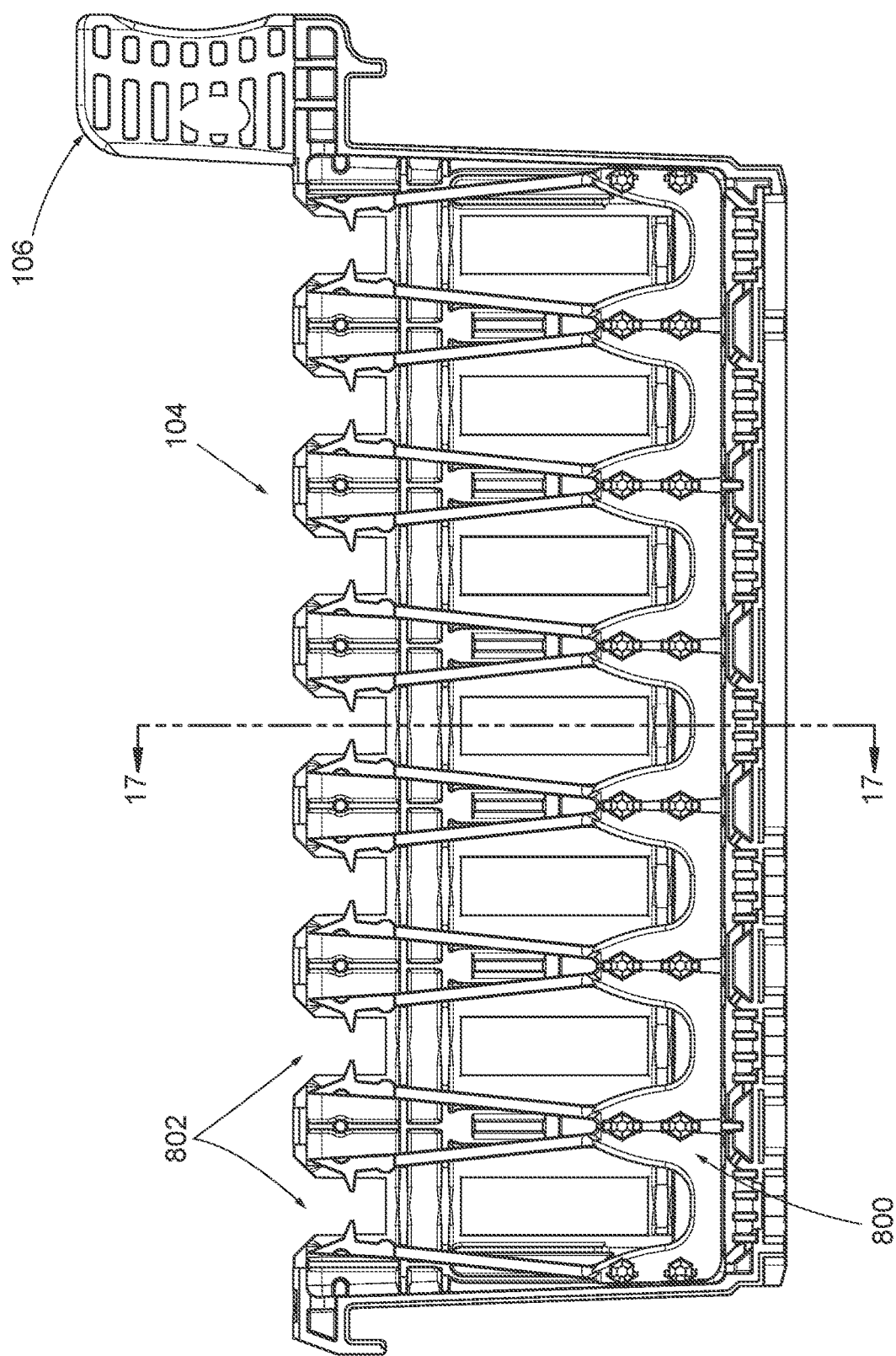
FIG. 16 depicts a front elevation view a rear portion of the housing of the rack of FIG. 1.
Figure 17:
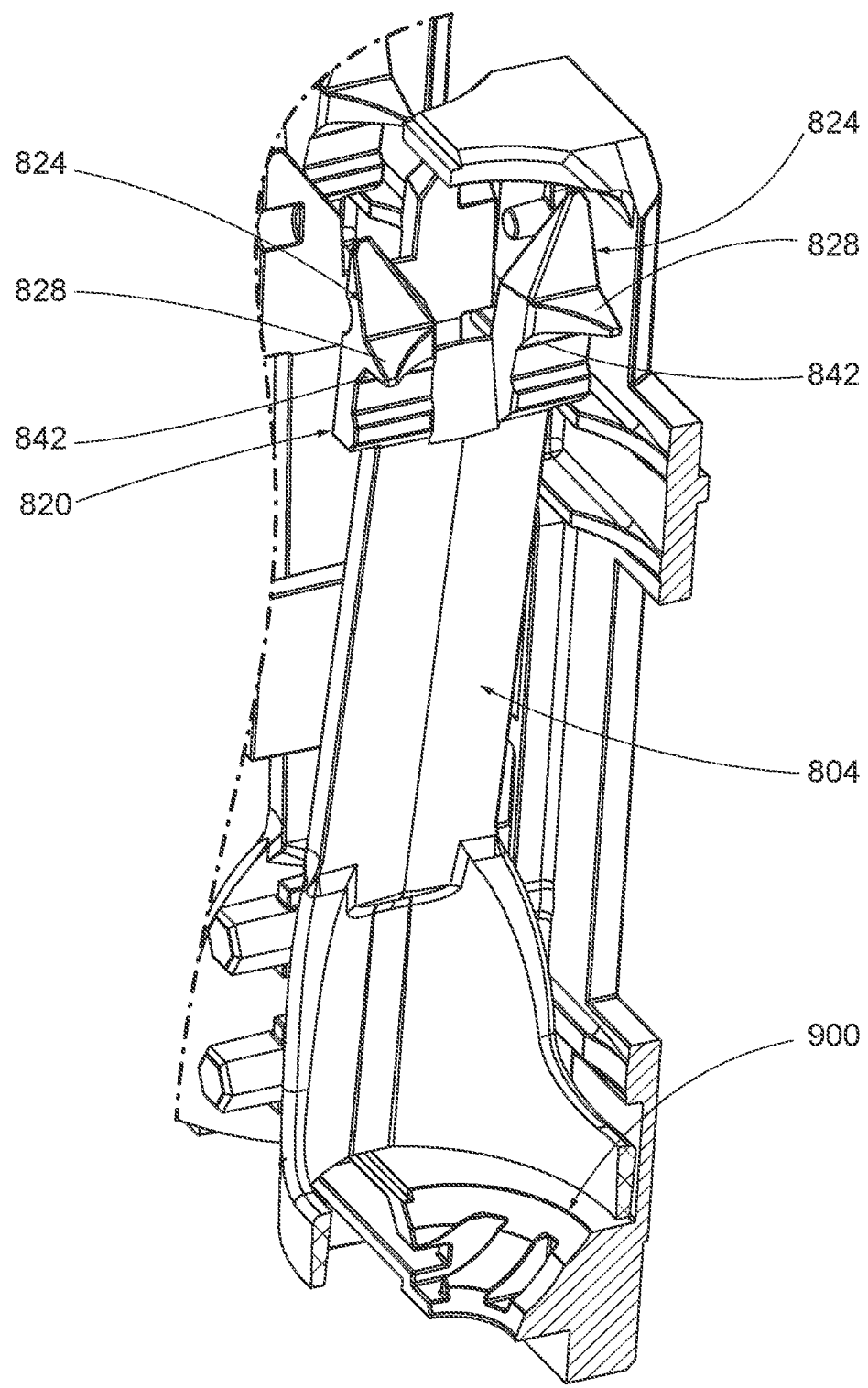
FIG. 17 depicts a cross section view of the rear portion of the housing of the rack of FIG. 1, taken along line 17-17 of FIG. 16.
Figure 18:
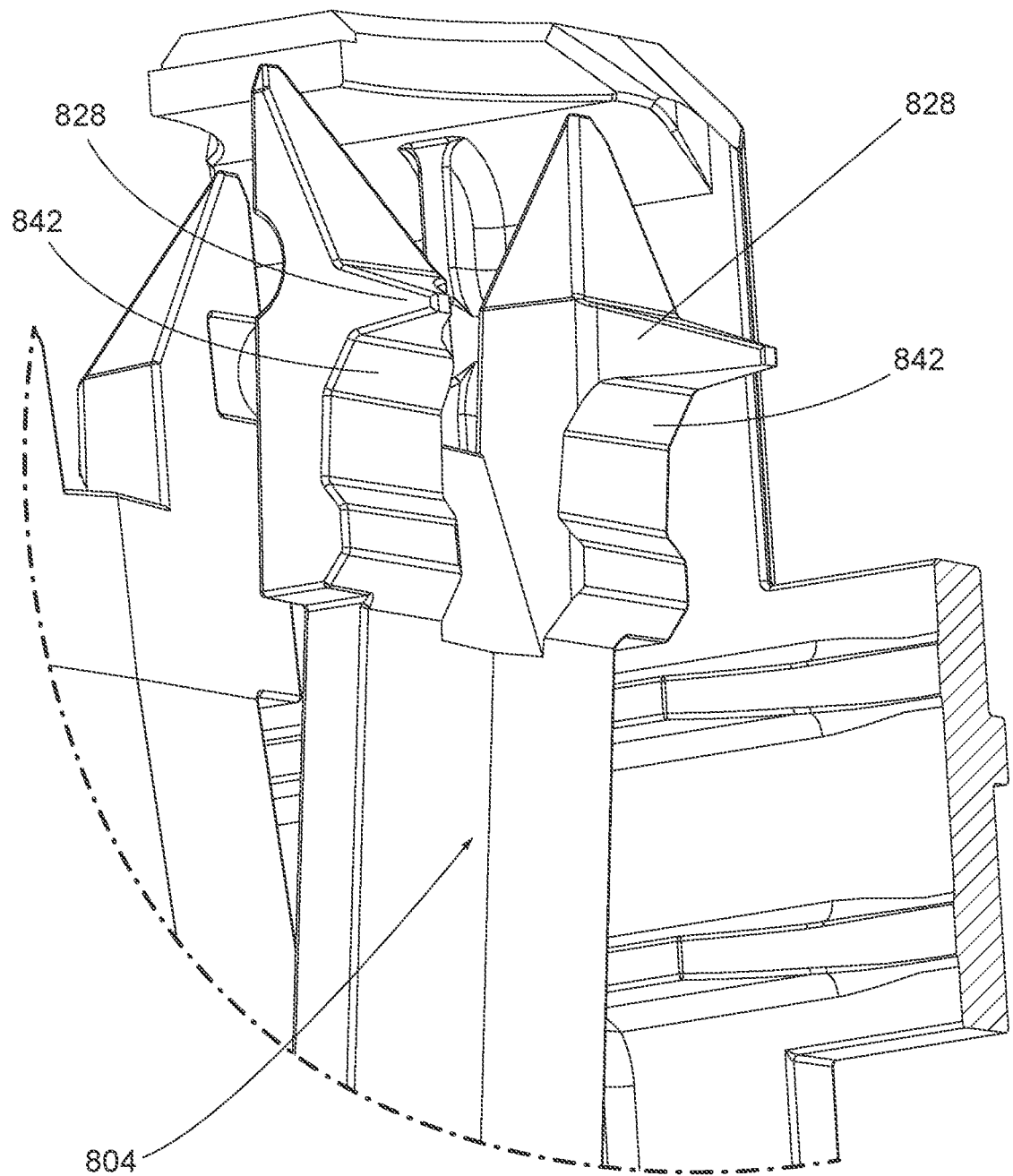
FIG. 18 depicts an enlarged view of the cross section view of FIG. 17.

FIGS. 16-18 illustrate another exemplary clamp insert (800) that is similar in all respect to clamp insert (300) described above except where described below. Thus the description above for clamp insert (300) and its components and features should be understood to apply equally to clamp insert (800). FIG. 16 illustrates a rack (10) with front portion (102) omitted to reveal clamp insert (800) within rear portion (104) of rack (10). FIGS. 17 and 18 illustrate enlarged cross section views that show features of clamps (802) of clamp insert (800) that differ from clamps (302) and clamp insert (300) described above. In particular, clamp insert (800) is the same in all respects to clamp insert (300) except that clamp insert (800) comprises clamps (802) with each arm (804) having top portions (820) that include chamfers (842). In the present example, each of the two arms (804) of clamp (802) comprise a pair of dual retention member (824), which provide that each clamp (802) of clamp insert (800) comprises four dual retention members (824) in total. Each clamp (802) includes multiple chamfers (842). In the present example, chamfers (842) are located just below each lateral projection (828) of each dual retention member (824).

Chamfers (842) are configured as sloped surfaces that assist in removing sample containers from rack (10) without clamps (802) scraping, defacing, or tearing a label that may be located on the sample container. In this manner, chamfers (842) provide a gradual transition to arms (804) where during removal of a sample container the side of the sample container may be guided along the sloped or angled surface as opposed to the side of the sample container contacting a portion of the arm (804) oriented orthogonally to the side of the sample container in which case the risk of scraping, defacing, or tearing a label on the sample container would be greater.

When clamp insert (800) is used with a sample cup having a flange as described above with respect to FIG. 19, chamfers (842) aid in the removal of a sample cup that may have been inadvertently inserted below lateral projections (828). In such an example, the flange of the sample cup may be guided along the sloped or angled surface and thereby deflect the arms (804) outward such that the sample cup can be removed from the grasp of clamp (802).

Referring again to clamp insert (300), in some versions clamp insert (300) is modified such that it also includes chamfers (842) in the same fashion as clamp insert (800). In view of the teachings herein, other ways to modify clamp inserts (300, 800) to include or omit chamfers (842) will be apparent to those of ordinary skill in the art.

J. Clamp Limiting Members

Still referring to FIG. 12-13, housing (100) further comprises limiting members (218) on an interior (902, 904) of both front and rear portions (102, 104) of housing (100). Limiting members (218) are configured to define a maximum amount or distance of deflection for each arm (304). As shown in FIGS. 10 and 12, each retention member (324) of top portion (320) of arms (304) comprises a recess (340). Recesses (340) are configured to engage with limiting members (218) depending on the extent of deflection of arms (304). In this manner, if too large of a sample container is attempted to be inserted within clamp (302), arms (304) will deflect until recesses (340) contact or engage with limiting members (218). This limit to the deflection of arms (304) provides a feedback feature to a user as to when an inappropriate sized sample container is trying to be used with rack (10).

While the above example uses limiting members (218) and recesses (340) to define a maximum amount of deflection for arms (304), other structures and features may be used instead of or in addition to limiting members (218) and recesses (340). For instance, fins (212) may also provide a limit or stop to the amount of deflection arms (304) may undergo. In the present example, fins (212) are configured to provide additional support to limiting members (218) and recesses (340) to prevent arms (304) from overbending or over-deflecting. In this manner, if one of limiting members (218) broke because of an excessive deflection force from arm (304), fins (212) would provide additional or backup support to limit deflection of arm (304). Thus, fins (212) can act as a safety feature that prevents overbending of arms (304). Other structures and features that may be used instead of or in addition to limiting members (218) and recesses (340) will be apparent to those of ordinary skill in the art in view of the teachings herein. Still yet, in some examples such a structure or feature for limiting deflection may be omitted altogether.

II. Alternate Exemplary Rack for Sample Container Handling

FIGS. 20-26 illustrate an exemplary rack (12), or portions thereof, for holding one or more sample containers. In the illustrated rack (12) of FIGS. 20-26, rack (12) is configured with features to accommodate sample cups of various sizes. Furthermore, certain features of rack (12) are configured to prevent using rack (12) with sample tubes such that users will instead use rack (10) described above for sample tubes.

Figure 20:
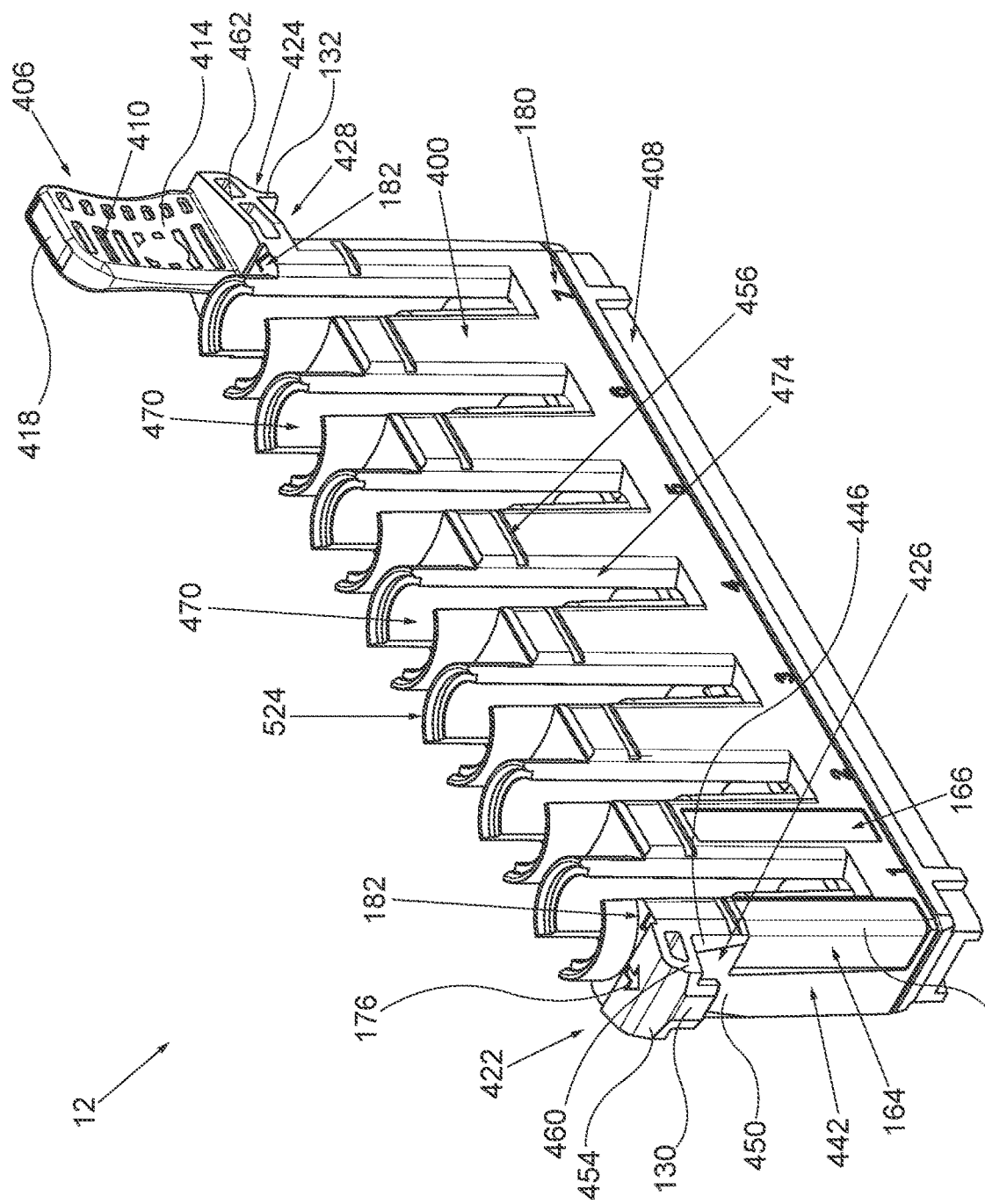
FIG. 20 depicts a top perspective view of another exemplary rack for holding one or more sample containers.
Figure 21:
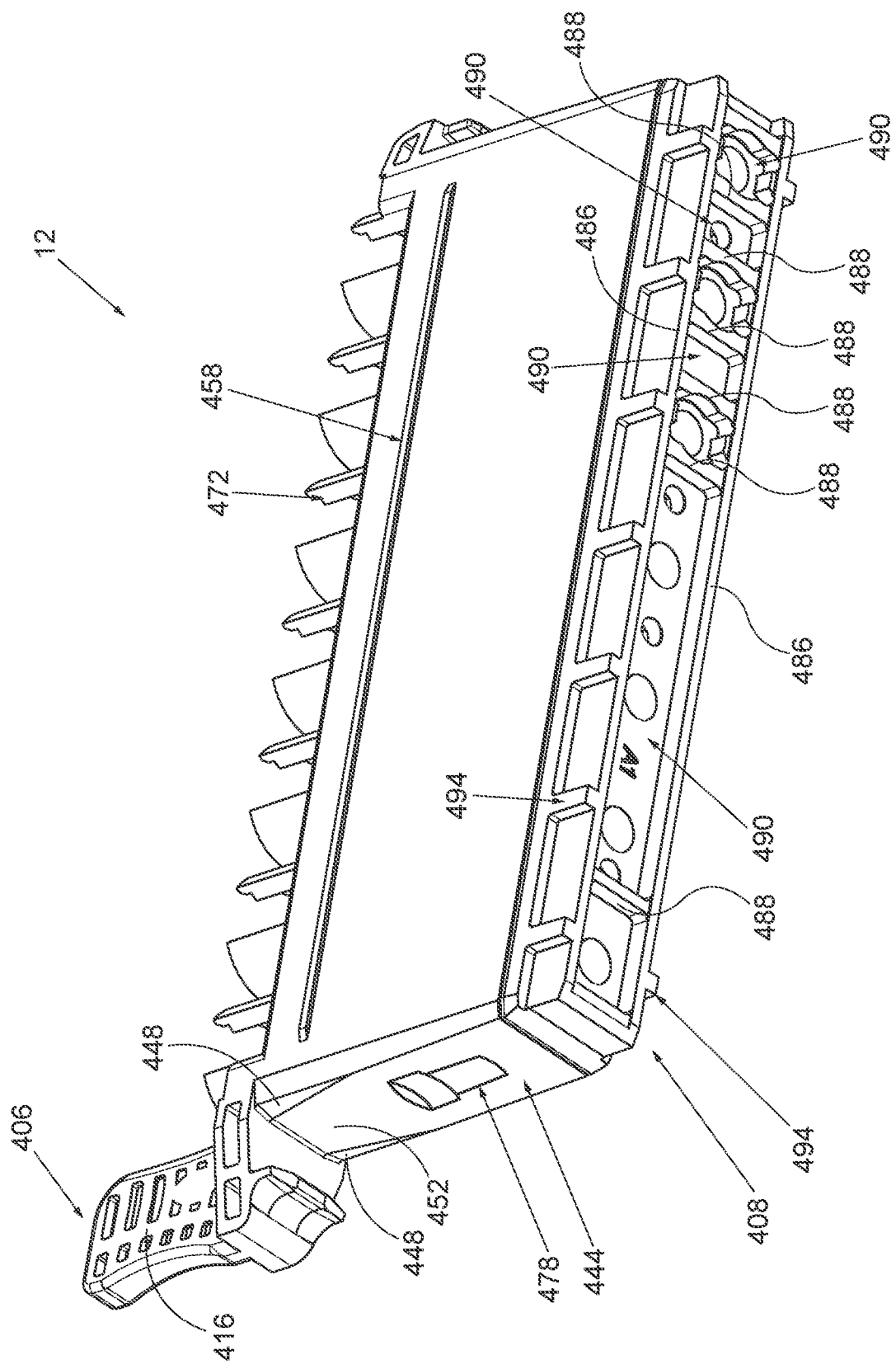
FIG. 21 depicts a bottom perspective view of the rack of FIG. 20.
Figure 22:
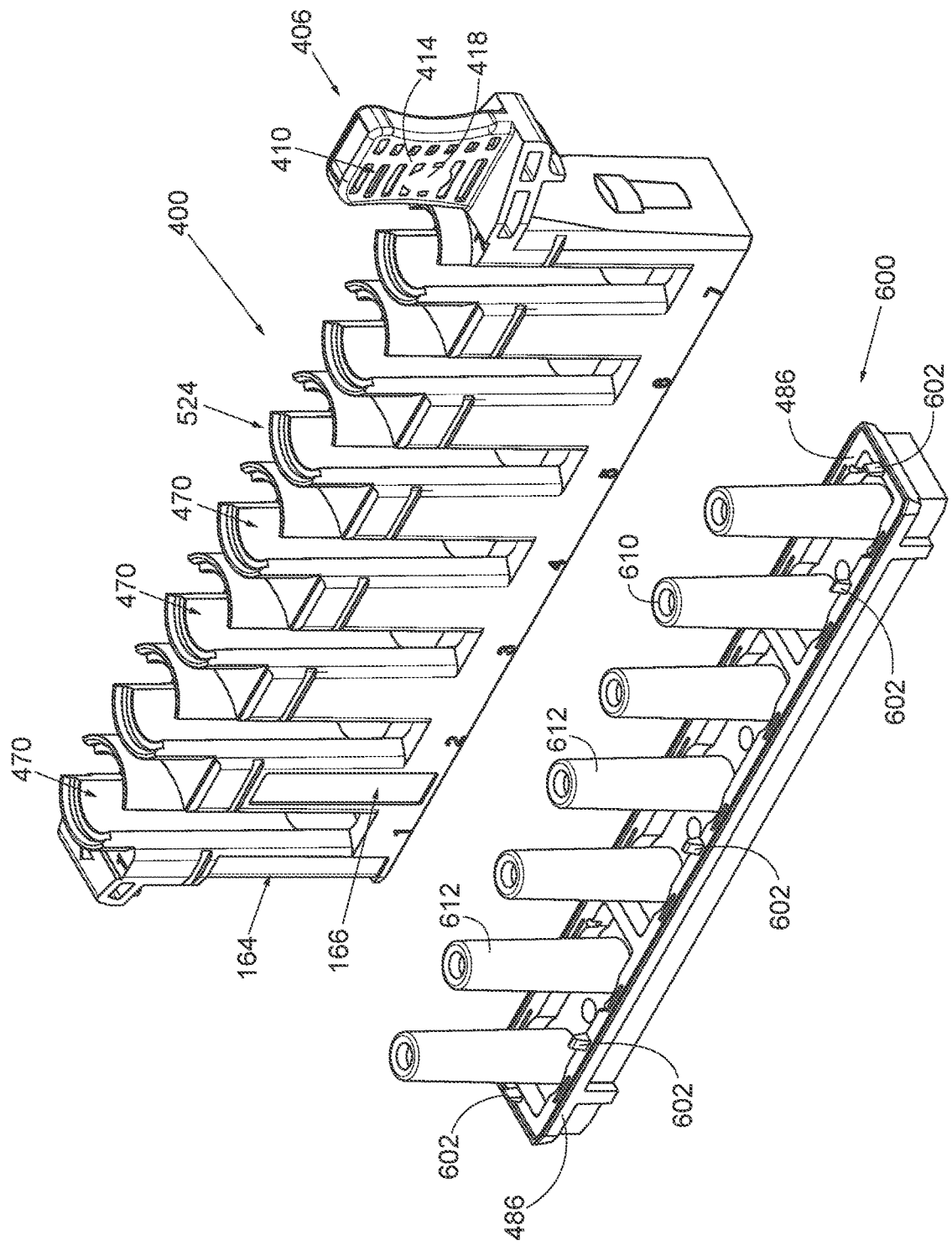
FIG. 22 depicts an exploded perspective view of the rack of FIG. 20.

Referring to FIGS. 20-22, rack (12) comprises housing (400) and stop insert (600). In the present example, housing (400) and stop insert (600) are single separate pieces that are molded and then assembled. In some other examples, housing (400) and/or stop insert (600) may be formed from multiple parts that are connected together prior to connecting housing (400) with stop insert (600). In view of the teachings herein, other ways to manufacture and assemble rack (12) will be apparent to those of ordinary skill in the art.

A. Handle

As shown in FIG. 20, rack (12) comprises handle (406). In the present example, handle (406) is formed as part of housing (400), but in some examples handle (406) may be formed separately and then connected with housing (400). Handle (406) extends from housing (400) in an upward direction away from a base (408) of rack (12). Handle (406) comprises gripping features (410). In the present example, gripping features (410) comprise a plurality of bores that extend through handle (406). Handle (406) comprises a concave front surface (414) and a concave rear surface (416). As illustrated, the plurality of bores extend through handle (406) from front surface (414) to rear surface (416).

Handle (406) further comprises a recessed area (418) along a top portion of handle (406). Recessed area (418) is configured as a location to receive a label. Such a label may indicate the type of rack, the type of tests being performed, sample information, etc. In view of the teachings herein, the various types of information suitable for use with a label positioned in recessed area (418) will be apparent to those of ordinary skill in the art.

B. Hooks

Housing (400) also comprises hooks (422, 424). Hooks (422, 424) are formed as parts of housing (400), and are formed as single molded features or structures of housing (400). Hooks (422, 424) define respective void spaces (426, 428), which are configured to receive a rail or other member of a rack handling system to support rack (12).

Hooks (422, 424) comprise respective fins (130, 132) as described above with respect to rack (10) and FIGS. 5-8, including chamfers (134, 136).

Rack (12) comprises ends (442, 444) that are formed with housing (400), and each end (442, 444) defines a portion of respective hooks (422, 424). Each end (442, 444) comprises respective chamfers (446, 448) along an outside surface of each end (442, 444) facing away from rack (12). In the illustrated version of FIG. 20, end (442) comprises two chamfers (446). Similarly, in the illustrated version of FIG. 21, end (444) comprises two chamfers (448). Between each chamfer (446) of end (442) and between each chamfer (448) of end (444), ends (442, 444) comprise respective sections (450, 452). In some examples sections (450, 452) comprise a chamfer as well, while in other examples sections (450, 452) may be straight. With this configuration, ends (442, 444) are configured to be positionable along one side of the rail or other supportive members of a rack handling system.

Chamfers (446, 448) aid in quickly locating or positioning rack (12) on such rails or other supportive members of a rack handling system as chamfers (446, 448) act or function as guides to guide the rack (12) into position with or engagement with such rails or other supportive members of a rack handling system.

Hook (422) further comprises a nose portion (454) that extends upward from fin (130) at an angle. This angled nose portion (454) comprises another chamfer that is configured to aid in lifting rack (12) away from the rails or other supportive members of a rack handling system. For instance, in some rack handling systems, multiple racks (12) may be installed in close proximity to one another. Providing angled nose portion (454) allows rack (12) to be lifted upward by handle (406). The lifting of handle (406) tilts rack (12) toward end (442). Because of angled nose portion (454), clearance is provided such that rack (12) is prevented from contacting or obstructing another rack that may be installed or positioned adjacent to end (442) of rack (12).

Hooks (422, 424) further comprise lead-in chamfers (460, 462) along each side of each respective hook (422, 424). In particular, hook (422) comprises chamfers (460) along each side, while hook (424) comprises chamfers (462) along each side. Chamfers (460, 462) provide hooks (422, 424) with an angled configuration such that hooks (422, 424) narrow as they extend away from a centerline of rack (12) or outward from rack (12). Chamfers (460, 462) are configured such that they guide rack (12) when transported to align rack within a transport or rack handling system to keep rack (12) properly positioned. For instance, when rack (12) is transported or moved in a direction parallel with a longitudinal axis of rack (12), should rack (12) contact any structures of the rack handling system during movement, chamfers (460, 462) will direct rack (12) back into alignment or a proper position within the rack handling system by contacting such structures of the rack handling system. In view of the teachings herein, other features that may be used with rack (12) or hooks (422, 424) of rack (12) to aid in handling and transport will be apparent to those of ordinary skill in the art.

C. Interlocking Bar and Groove

Referring to FIGS. 20 and 21, rack (12) further comprises a longitudinally extending groove (456) along front of housing (400). Additionally, rack (12) comprises a longitudinally extending bar (458) along rear of housing (400). Note that in some versions, groove (456) may instead be positioned along rear of housing (400) with bar (458) positioned along front of housing (400). When multiple racks (12) are used, bar (458) of one rack (12) cooperates with groove (456) of an adjacent rack (12) in the same manner as described above with respect to groove (156) and bar (158) of rack (10).

While in the present example, grooves (456) and bars (458) are shown and described as features of rack (12), in some instances racks other than rack (12) can be configured with the same or similar grooves (456) and bars (458). Similarly, grooves (456) and bars (458) of these other racks may be located at a same distance from a bottom of the respective racks such that these cooperating features may work together across different rack designs. For example, in the present examples, bars (158) of rack (10) may align with and be able to cooperate with grooves (458) of rack (12) and vice versa.

In the present example, one aspect of groove (456) and bar (458) is that their longitudinally extending configuration provides support for engaged adjacent racks along substantially the entire length of the racks, or at least support is provided along a majority of the length of the racks. Of course in other versions, groove (456) and/or bar (458) are not required to extend longitudinally substantially the length of rack (12), and instead may extend only partially along rack (12) or only in certain locations along rack (12).

While in the present example, the cooperating features of adjacent racks are shown and described as grooves (456) and bars (458), in other examples grooves (456) and bars (458) can be modified or replaced with other structures that provide the same or similar function. Such other structures or features will be apparent to those of ordinary skill in the art in view of the teachings herein.

D. Recessed Identification Areas

Referring again to FIG. 20, rack (12) comprises recessed area (164) formed along a corner (401) of housing (400). Recessed area (164) is described above with respect to rack (10) and that same description of recessed area (164) applies equally to rack (12) here. As shown in FIG. 20, an additional recessed area (166) can be provided on the front of housing (400). Recessed area (166) is described above with respect to rack (10) and that same description of recessed area (166) applies equally to rack (12) here.

E. Windows and Indicia

Rack (12) includes other visual features. In the present example rack (12) has a solid back of housing (400). In some other versions rack (12) may be modified to incorporate viewing apertures the same or similar to viewing apertures (168) described above with respect to rack (10).

With rack (12), each of the spaces (470) for receiving sample cups are at least partially defined by a respective U-shaped notch (472) in the rear of housing (400) as shown in FIG. 21. On the front of housing (400), each space (470) is at least partially defined by a respective elongated U-shaped notch (474) as shown in FIG. 20. Notches (474) align across from notches (472). Notches (472, 474) provide for a location for viewing labels of sample cups, viewing samples contained within sample cups, and/or scanning a barcode or other scannable feature on the sample cups themselves or labels affixed to the sample cups. With the configuration described above, notches (472, 474) provided for finger gripping of the sample cups that may be positioned within spaces (470) of rack (12). While the present example shows notches (472, 474) as having U-shapes or elongate U-shapes, in view of the teachings herein, other shapes for notches (472, 474) will be apparent to those of ordinary skill in the art.

Rack (12) further includes certain indicia to assist in the use of rack (12). For instance, rack (12) includes a direction arrow (176) in the same manner as described above with respect to rack (10). Rack (12) further includes a graphic (478) as seen in FIG. 21. Graphic (478) is configured to communicate to the user the type of sample container compatible for use with rack (12). In the present example, graphic (478) has the form of a sample cup style sample container. Thus in the present example graphic (478) is configured to communicate to a user that rack (12) is compatible and/or usable with at least sample containers comprising sample cups.

As shown in FIG. 21, graphic (478) is located on end (444) of housing (400). Thus, graphic (478) is located on the same end of housing (400) as is handle (406). By locating graphic (478) on the same end of housing (400) as handle (406), a user may easily observe or check the rack type being picked up to ensure that the desired rack style is selected— sample tube style compatible or sample cup style compatible. In view of the teachings herein, other forms and placements for graphic (478) of rack (12) will be apparent to those of ordinary skill in the art.

Rack (10) further comprises position indicators (180) that correspond with spaces (470) within rack (12). Position indicators (180) are the same as position indicators (180) described above with respect to rack (10), and the description above for position indicators (180) is understood to apply equally to both racks (10, 12). Additionally, rack (12) comprises position indicators (182) that are located along a top surface of the front of housing (400) as shown in FIG. 20. Position indicators (182) are the same as position indicators (182) described above with respect to rack (10), and the description above for position indicators (182) is understood to apply equally to both racks (10, 12). In view of the teachings herein, other ways to incorporate viewing features—such notches (472, 474)—and indicia—such as arrow (176), graphic (478), and position indicators (180, 182)—into rack (12) will be apparent to those of ordinary skill in the art.

F. Stop Insert

Figure 23:
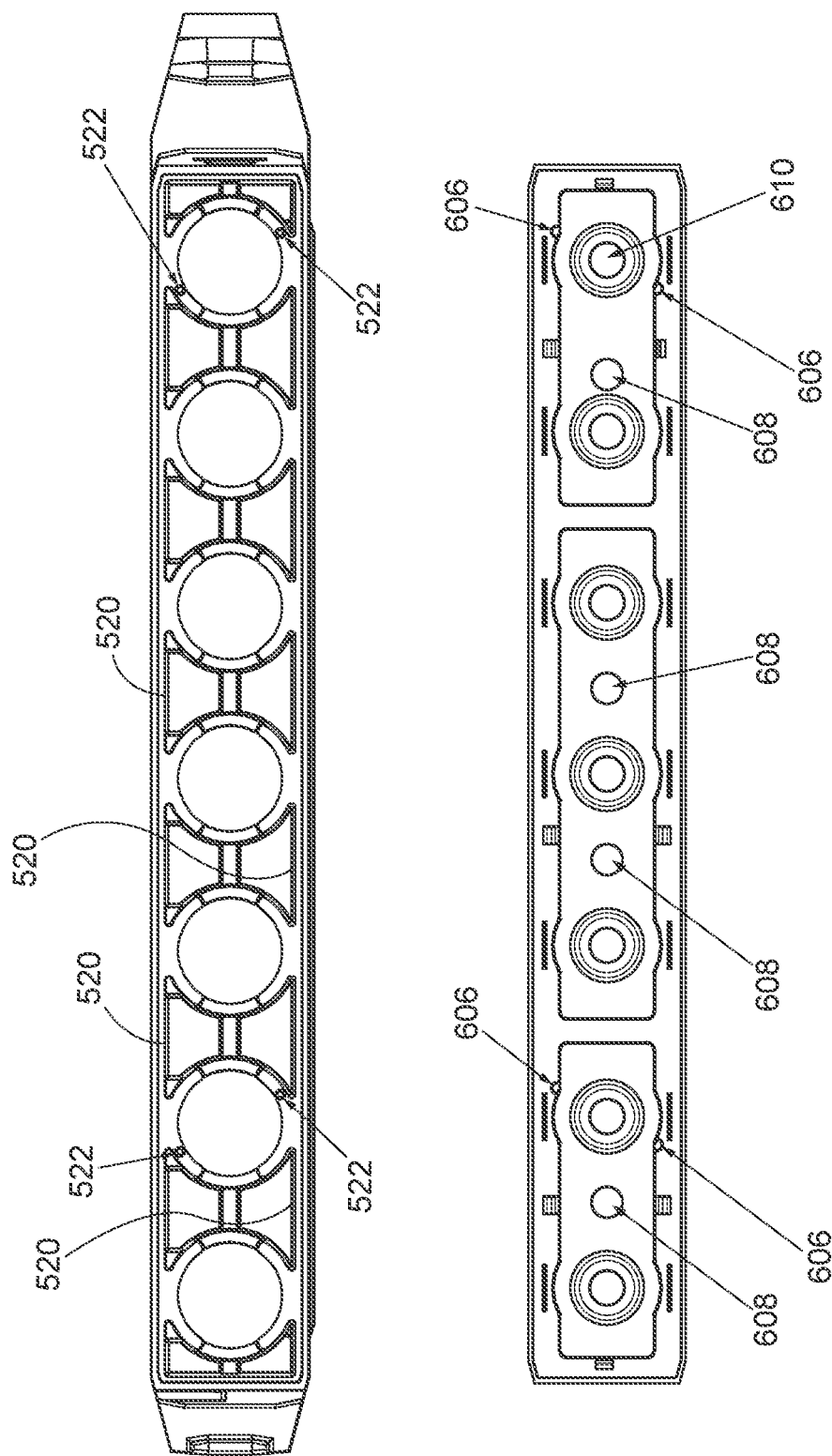
FIG. 23 depicts an exploded view of the rack of FIG. 15, showing a top view of a stop insert next to a bottom view of a housing.

FIGS. 22 and 23 show stop insert (600) separated from housing (400). In assembling rack (12), stop insert (600) is positioned within housing (400) from beneath housing (400). In this manner, stop insert (600) comprises base (408) as described further below. Stop insert (600) also comprises engaging features (602) configured as upward projecting fins. Engaging features (602) are resilient and will deflect when stop insert (600) is assembled with housing (400). For instance, in one example, each engaging feature (602) contacts an interior wall (520) of housing (400) when being assembled. Engaging features (602) deflect and apply force to interior wall (520), which holds stop insert (600) together with housing (400). In some examples, ultrasonic welding is also used to securely connect stop insert (600) with housing (400). Other structures and techniques for securely connecting stop insert (600) with housing (400) will be apparent to those of ordinary skill in the art in view of the teachings herein.

As shown in FIG. 23, housing (400) comprises posts (522) that are configured to engage with corresponding mating features (606) of stop insert (600). In the present example, mating features (606) are configured as void spaces for receiving posts (522) during assembly of stop insert (600) with housing (400). In the present example, the arrangement of mating features (606) and posts (522) is such that stop insert (600) will only be accepted within housing (400) if oriented in one direction or way. Thus, mating features (606) and posts (522) act as a poka-yoke feature to make it difficult or impossible to connect stop insert (600) with housing (400) in an incorrect orientation. Stated another way, in the present example, posts (522) will only align with mating features (606) when stop insert (600) is properly positioned relative to housing (400). In view of the teachings herein, other ways to incorporate and configure various engaging features and assemble stop insert (600) with housing (400) will be apparent to those of ordinary skill in the art.

As mentioned above, stop insert (600) comprises base (408). FIG. 21 shows base (408), which comprises longitudinally extending beams (486). As shown in the example of FIG. 21, beams (486) extend nearly the full the length of rack (12), but in other versions beams (486) may extend less than nearly the full length. Together, beams (486) are configured as the bottom surface upon which rack (12) sits when placed on a surface in an upright orientation. Base (408) further comprises transversely extending dividers (488), which are identical to dividers (188) described above such that the description above for dividers (188) applies equally to dividers (488) as it pertains to rack (12).

In the illustrated example, two rectangular recesses (490) within base (408) are configured to engage with features of a rack handling system to control movement of rack (12) in the same manner as the two rectangular recesses (190) described above with respect to rack (10). Accordingly, the description above for the two rectangular recesses (190) applies equally to the two rectangular recesses (490) as they pertain to rack (12).

In the present example, like rack (10), rack (12) does not contain magnets. However, in some other versions, base (408) of rack (12) can be configured with magnets as described above with respect to rack (10). Again, while in the illustrated example, magnets are not required, in view of the teachings herein, those of ordinary skill in the art will understand various ways magnets may be incorporated with and used with rack (12).

Base (408) of rack (12) further comprises column features (494) on a front and rear side of base (408). Along a rear side of base (408), each column feature (494) aligns with one of spaces (470) configured to receive a sample cup. In this manner, column features (494) on the rear of base (408) may be used to index the location of the sample cups. For example, column features (494) on the rear of base (408) can be used in a rack handling system to stop rack (12) at each space (470) coinciding with a sample cup's position. In a rack handling system, the two column features (494) of the front of base (408) can be used to push or pull rack (12) in transfer lanes of the rack handling system. Note that use of column features (494) is not required in all versions. In some instances one rack handling system may be configured to move and handle rack (12) based on column features (494). In some other instances, another rack handling system may be configured to move and handle rack (12) based on one or more recesses (490) as described above. And still in other instances a rack handling system may be configured to move and handle rack (12) based on a combination of one or more recesses (490) and one or more column features (494). In view of the teachings herein, other ways to configure rack (12) and those systems that handle racks (12) will be apparent to those of ordinary skill in the art.

As shown in FIGS. 21 and 23, base (408) of rack (12) further comprises drain holes (608). Drain holes (608) are configured to drain water from within rack (12) after cleaning etc. In this manner water or other cleaning fluid is prevented from being trapped within rack (12). Drain holes (608) also provide for venting to assist with drying rack (12) after cleaning. In addition to drain holes (608), openings (610) within rods (612) of stop insert (600) also provide for drainage and venting.

Stop insert (600) comprises rods (612) as mentioned above. Rods (612) are configured as stop features that are positioned within spaces (470) of housing (400). The height of rods (612) is lower than the height of spaces (470). In this manner, rods (612) are configured to not interfere or contact a supported sample cup within rack (12). Rods (612) are however configured such that if one mistakenly attempts to use rack (12), which is designed for sample cups, with a sample tube, the sample tube will contact rod (612) within space (470). This contact will prevent the sample tube form being supported by cradles (524). This visual and tactile lack of support for the sample tube provides feedback to a user that an alternate rack, such as rack (10), is needed for use with a sample tube. In view of the teachings herein, other structures that may be used instead of or in addition to rods (612) as a tube stop feature will be apparent to those of ordinary skill in the art.

G. Sample Cup Locators

Figure 24:
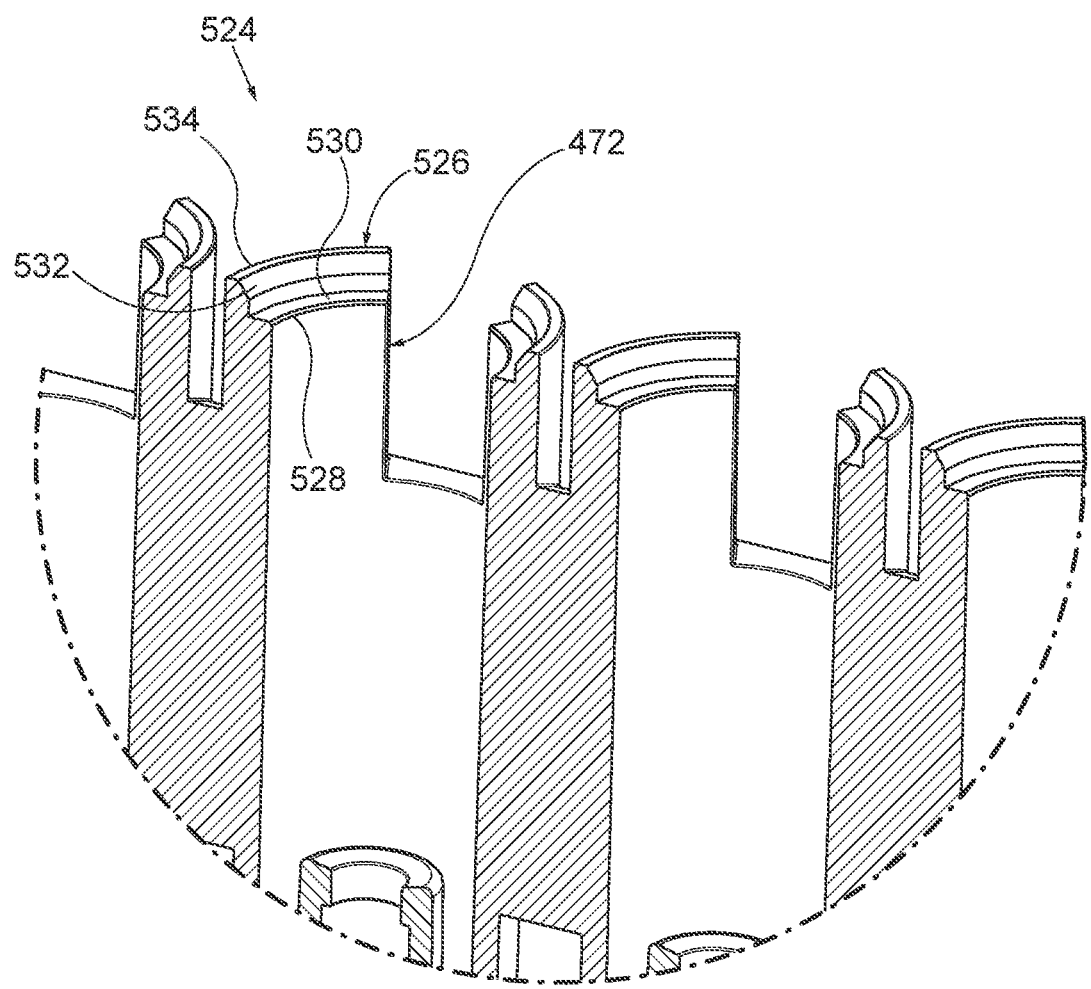
FIG. 24 depicts a partial cross section view of a portion of the rack of FIG. 20.

FIGS. 20 and 24 show an upper region of housing (400) comprising cradles (524) that are configured to receive one or more sample cups. Cradles (524) are aligned with spaces (470) for holding sample tubes, and further cradles (524) are open such that cradles (524) provide access to spaces (470). Cradles (524) in the present example have a circular profile interrupted by U-shaped notches (472, 474) on each side.

FIG. 24 shows cradles (524) comprise a multi-level top surface (526). In the present example, multi-level top surface (526) comprises an angled lower rim (528) configured to guide placement of a sample cup within space (470). Multi-level surface (526) further comprises lower shelf (530) configured to support a sample cup inserted within space (470). Multi-level surface (526) further comprises angled upper rim (532) and upper shelf (534). Depending on the size of the sample cup used, angled upper rim (532) is configured to either guide the sample cup to lower shelf (530), or to support the sample cup. Upper shelf (534) 534) is configured to support a sample cup in a similar manner to lower shelf (530). As shown, angled lower rim (528), lower shelf (530), angled upper rim (532), and upper shelf are concentrically oriented, each defining a different diameter within the top of space (470). Furthermore, angled lower rim (528), lower shelf (530), angled upper rim (532), and upper shelf are arranged at varying heights relative to one another as shown. With this multi-level configuration, rack (12) is configured for use with sample cups of various sizes.

Figure 25:
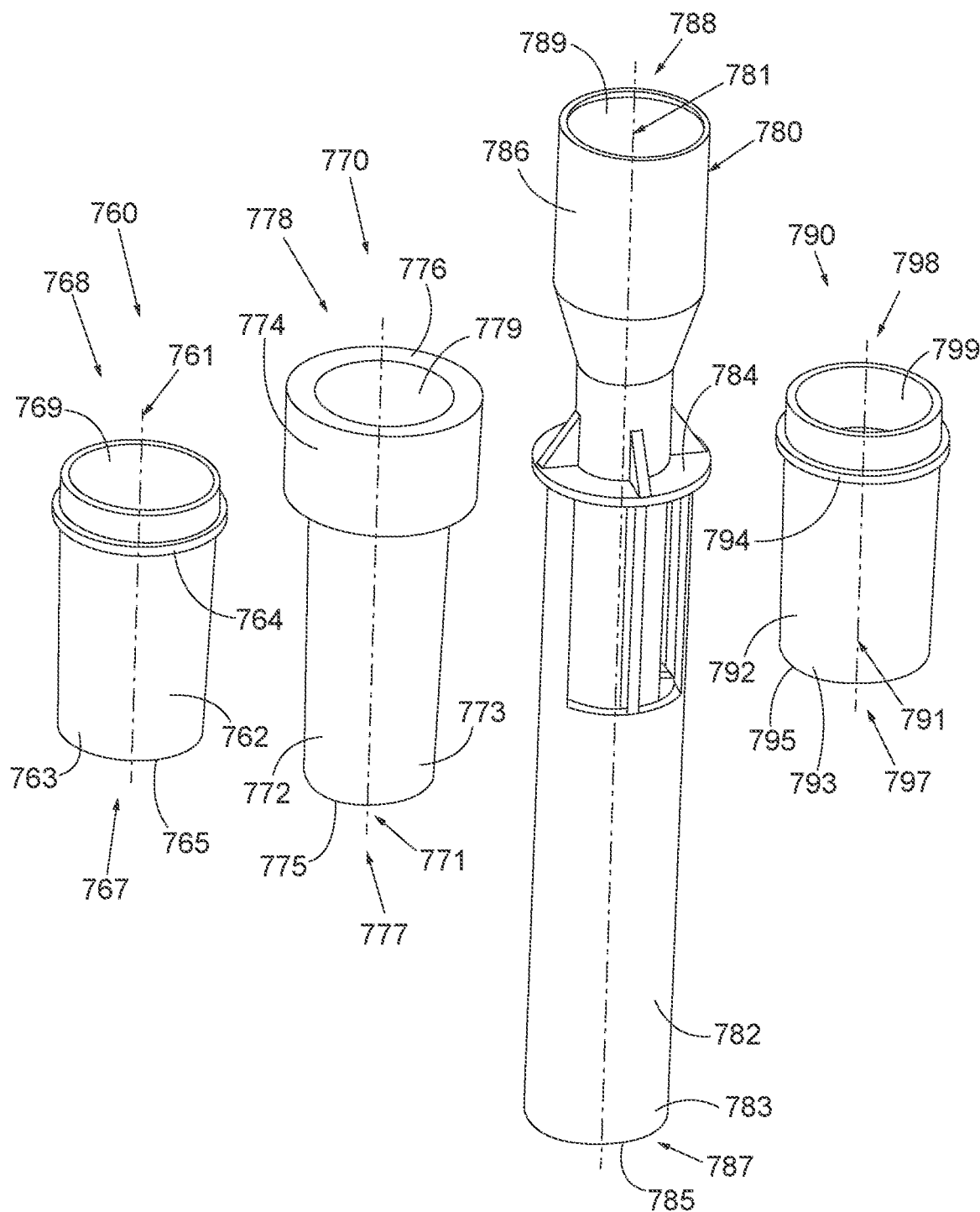
FIG. 25 depicts a plurality of exemplary sample cups usable with the racks of FIGS. 1 and 20.

FIG. 25 illustrates, by way of example only and not limitation, several sample containers in the form of sample cups that are usable with rack (12) described above. Sample cup (760) comprises a body (762), a flange (764) extending outward from body (762), a first end (767), and a second end (768). First end is closed and includes a bottom or end portion (763) represented in the present example as a non-radiused tip (765). Second end (768) includes an opening (769) configured to receive a sample. Sample cup (760) defines a longitudinal axis (761). Sample cup (760) is configured with a 2 milliliter volume in the present example. Sample tube (760) may be revolved about longitudinal axis (761). Sample tube (760) may be symmetrical about its longitudinal axis (761)—axisymmetric—as shown, but in other versions sample tube (760) may be partially symmetrical or asymmetrical. Sample tube (760) may be cylindrical, have a cylindrical portion, the cylindrical portion may have draft (to facilitate molding) and thus be conical, etc. In view of the teachings herein, other modifications to sample tube (760) will be apparent to those of ordinary skill in the art.

Sample cup (770) comprises a body (772), a flange (774) extending outward from body (772), a first end (777), and a second end (768). First end is closed and includes a bottom or end portion (773) represented in the present example as a non-radiused tip (775). Second end (778) includes an opening (779) configured to receive a sample. Flange (774) extends to a top (776) of sample cup (770) as shown. Sample cup (770) defines a longitudinal axis (771). Sample cup (770) is configured with a 2 milliliter volume in the present example. Sample tube (770) may be revolved about longitudinal axis (771). Sample tube (770) may be symmetrical about its longitudinal axis (771)—axisymmetric—as shown, but in other versions sample tube (770) may be partially symmetrical or asymmetrical. Sample tube (770) may be cylindrical, have a cylindrical portion, the cylindrical portion may have draft (to facilitate molding) and thus be conical, etc. In view of the teachings herein, other modifications to sample tube (770) will be apparent to those of ordinary skill in the art.

Sample cup (780) comprises a lower body portion (782), a flange (784) extending outward from lower body portion (782), an upper body portion (786) located above flange (784), a first end (787), and a second end (788). First end (787) is closed and includes a bottom or end portion (783) represented in the present example as a non-radiused tip (785). Second end (788) includes an opening (789) configured to receive a sample. Sample cup (780) defines a longitudinal axis (781). Sample cup (780) is configured with a 3 milliliter volume in the present example. Sample tube (780) may be revolved about longitudinal axis (781). Sample tube (780) may be symmetrical about its longitudinal axis (781)—axisymmetric—as shown, but in other versions sample tube (780) may be partially symmetrical or asymmetrical. Sample tube (780) may be cylindrical, have a cylindrical portion, the cylindrical portion may have draft (to facilitate molding) and thus be conical, etc. In view of the teachings herein, other modifications to sample tube (780) will be apparent to those of ordinary skill in the art.

Sample cup (790) comprises a body (792), a flange (794) extending outward from body (792), a first end (797), and a second end (798). First end (797) is closed and includes a bottom or end portion (793) represented in the present example as a non-radiused tip (795). Second end (798) includes and opening (799) configured to receive a sample. Sample cup (790) defines a longitudinal axis (791). Sample cup (790) is configured with a 0.5 milliliter volume in the present example. Sample tube (790) may be revolved about longitudinal axis (791). Sample tube (790) may be symmetrical about its longitudinal axis (791)—axisymmetric—as shown, but in other versions sample tube (790) may be partially symmetrical or asymmetrical. Sample tube (790) may be cylindrical, have a cylindrical portion, the cylindrical portion may have draft (to facilitate molding) and thus be conical, etc. In view of the teachings herein, other modifications to sample tube (790) will be apparent to those of ordinary skill in the art. Sample cups as shown in FIG. 25 and described above are available from providers such as Beckman Coulter and Hitachi.

Figure 26:
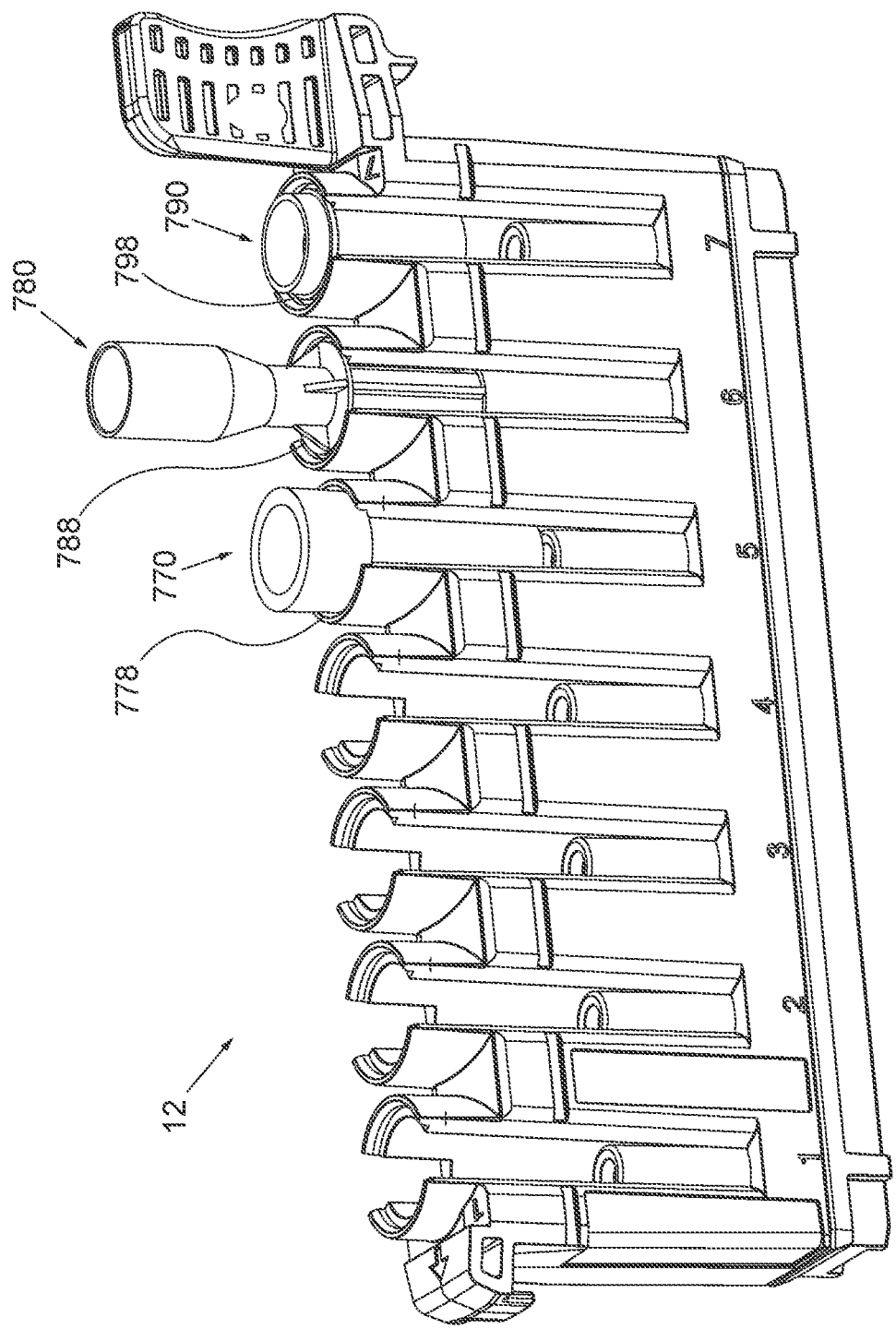
FIG. 26 depicts a perspective view of the rack of FIG. 20, shown with various style sample cups retained therein.

FIG. 26 illustrates rack (12) retaining sample cups (770, 780, 790) within various positions within rack (12). Referring also to FIG. 24, lower shelf (530) engages with the underside of flanges (774, 784, 794) to selectively retain sample cups (770, 780, 790) within rack (12). In this manner, respective interfaces (778, 788, 798) are defined by at least a portion of the underside of respective flanges (774, 784, 794) of sample cups (770, 780, 790) and at least a portion of lower shelf (530) such that there is a common boundary between respective flanges (774, 784, 794) and lower shelf (530) when sample cups (770, 780, 790) are retained within rack (12). In view of the teachings herein, other sample cups compatible for use with rack (12) will be apparent to those of ordinary skill in the art. Additionally, in view of the teachings herein, various ways to modify rack (12) and multi-level top surface (526) to accommodate other sized sample cups will be apparent to those of ordinary skill in the art.

Referring to FIG. 26 and FIG. 19 as described above, the same features of a sample container may interface with rack (10) and rack (12) as shown and described herein. For example, flanges (752, 764, 774, 784, 794) of sample cups (750, 760, 770, 780, 790) are configured to interface with both clamp inserts (300, 800) of rack (10) as well as interfacing with shelf (530) of cradles (524) of rack (12). Similarly, the sample containers described herein may be configured with bottoms and/or outer diameters that make the various sample containers usable with either rack (10) or rack (12). In view of the teachings herein, other features of a given sample container that may interface with both rack (10) and rack (12) such that the sample container is suitable for use with either, will be apparent to those of ordinary skill in the art in view of the teachings herein.

Figure 27:
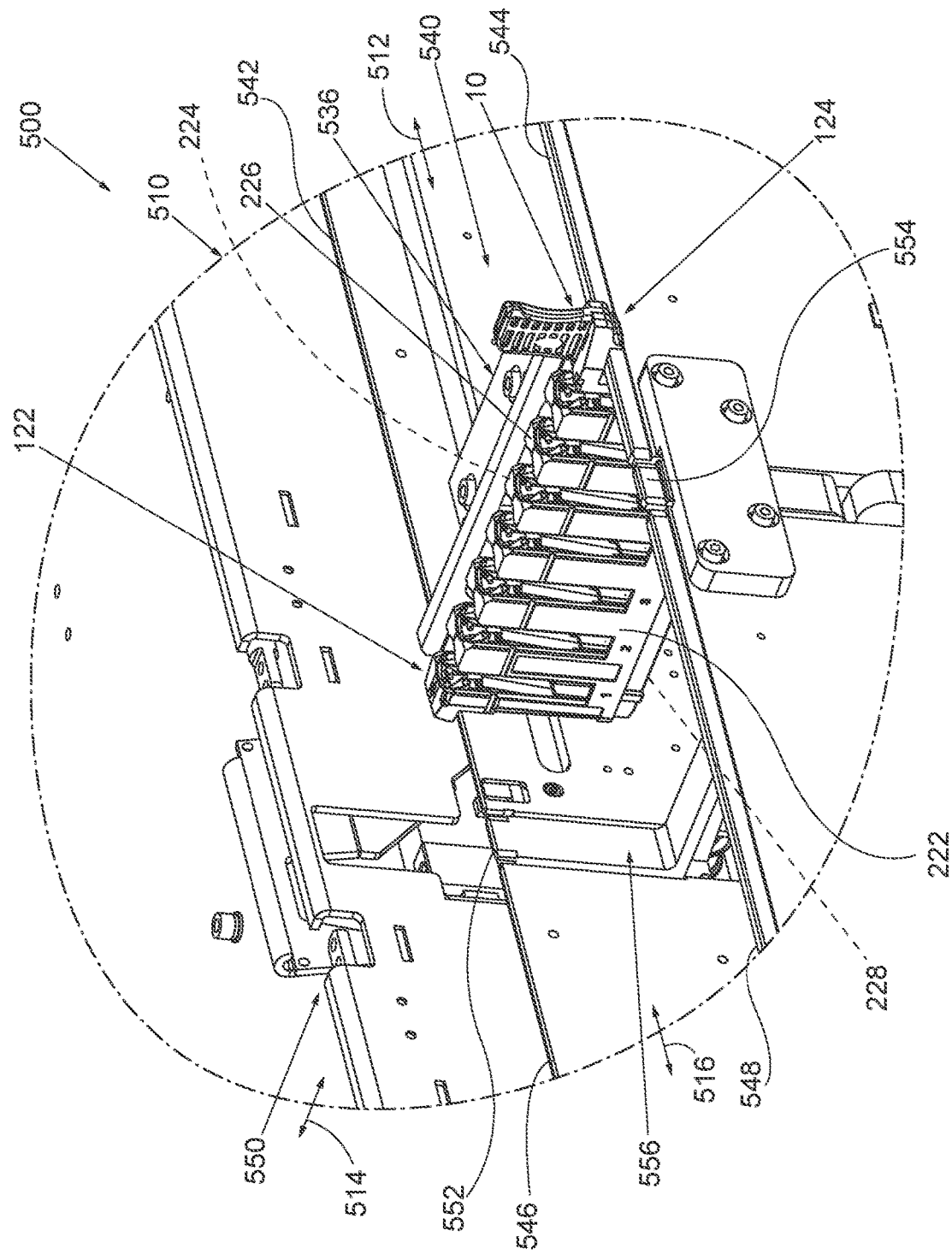
FIG. 27 depicts a perspective view of the exemplary rack of FIG. 1 installed at a first position in an exemplary sample presentation unit (SPU) of an exemplary sample analyzer.
Figure 28:
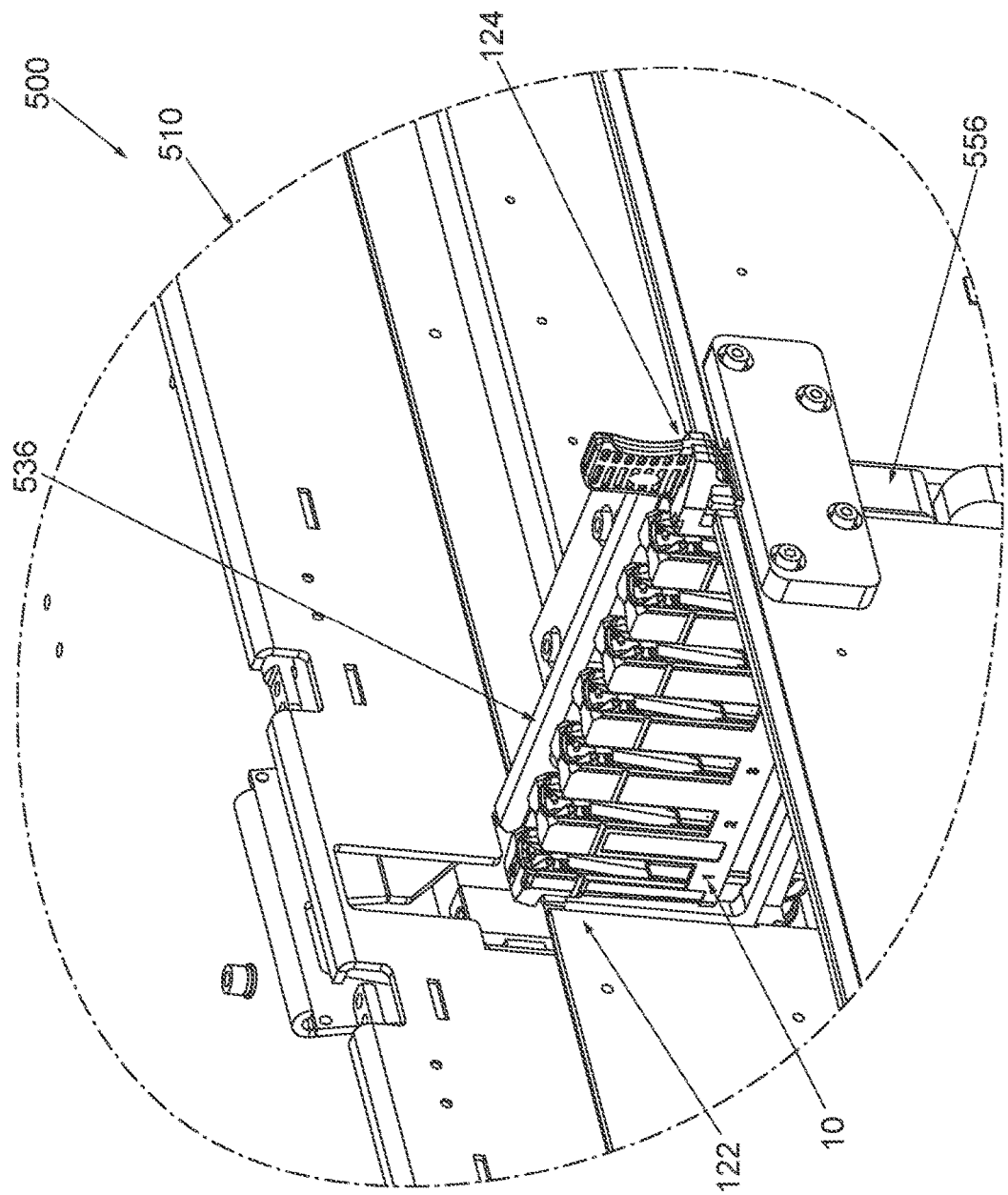
FIG. 28 depicts the perspective view of FIG. 27 of the exemplary rack of FIG. 1 and the exemplary sample presentation unit (SPU) of the exemplary sample analyzer, but with the exemplary rack at a second position of the SPU.
Figure 29:
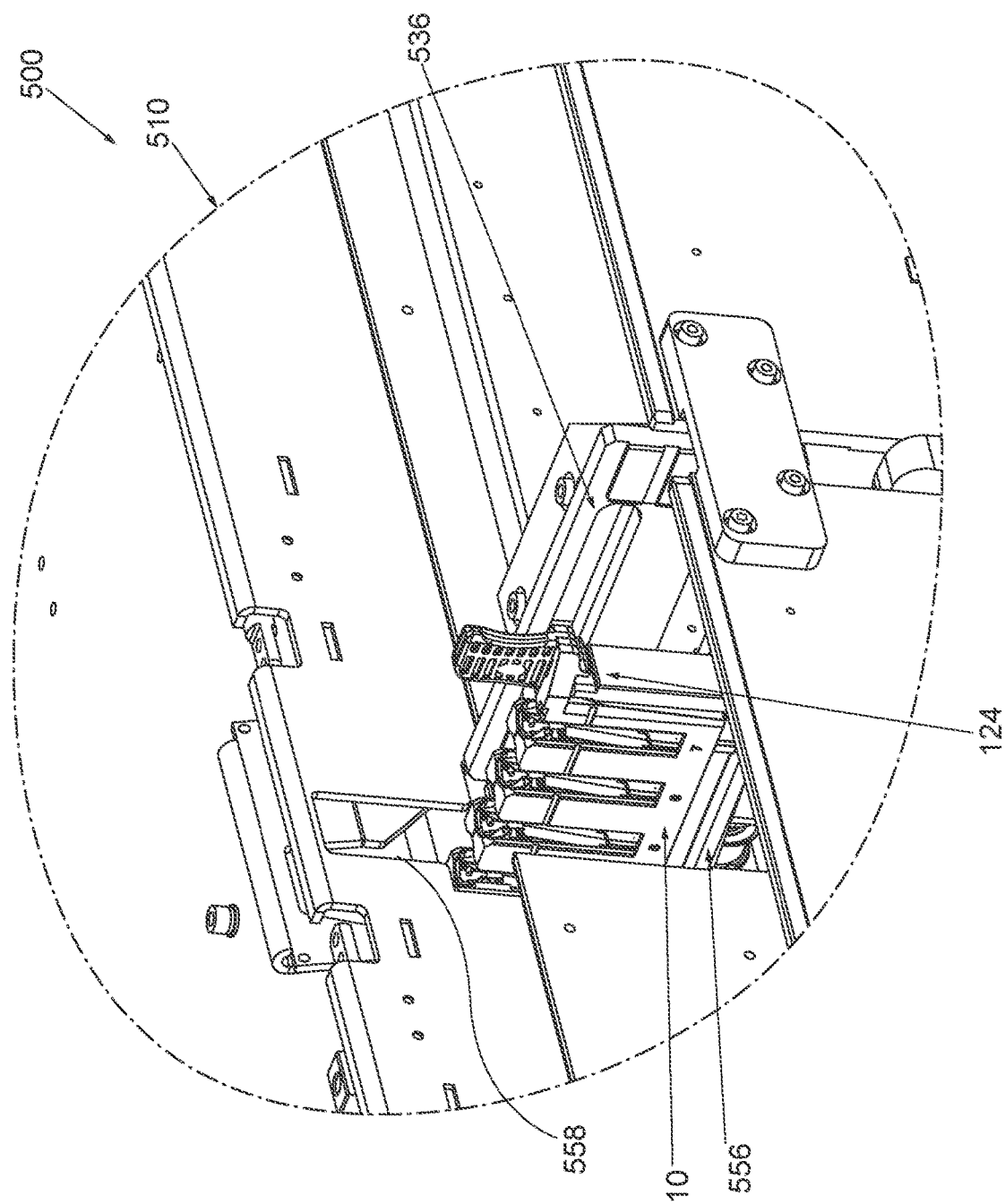
FIG. 29 depicts the perspective view of FIG. 27 of the exemplary rack of FIG. 1 and the exemplary sample presentation unit (SPU) of the exemplary sample analyzer, but with the exemplary rack partially moved out of the second position of the SPU, depicted at FIG. 28.

The racks (10, 12) may be used in a variety of applications and thereby hold and/or transfer one or more of the sample containers (700, 720, 740, 760, 770, 780, 790) in various combinations. FIGS. 27-29 illustrate an example application where the racks (10, 12) hold and transfer one or more sample containers (700, 720, 740, 760, 770, 780, 790) in and about an exemplary sample analyzer (500). The sample containers (700, 720, 740, 760, 770, 780, 790) are not shown at FIGS. 27-29. However, one or more of the sample containers (700, 720, 740, 760, 770, 780, 790) may be positioned in the racks (10, 12) in various combinations, as described in detail above. One or more of the sample containers (700, 720, 740, 760, 770, 780, 790) may be individually inserted through one or more of the openings (171) of the spaces or compartments (170) (e.g., through a top (226) of the rack (10) toward a bottom (228) of the rack (10)). A single rack (10) is shown at FIGS. 27-29. However, a plurality of the racks (10, 12) may be used together in various combinations in the exemplary sample analyzer (500).

When used with the sample analyzer (500), the rack (10, 12) may be loaded with one or more of the sample containers (700, 720, 740, 760, 770, 780, 790) before the rack (10, 12) is loaded into the sample analyzer (500). The rack (10, 12) may thereby also be used to hold and transfer one or more of the sample containers (700, 720, 740, 760, 770, 780, 790) to and/or from the sample analyzer (500). Alternatively, the rack (10, 12) may be loaded with one or more of the sample containers (700, 720, 740, 760, 770, 780, 790) after the rack (10, 12) has been loaded into the sample analyzer (500). Alternatively, the rack (10, 12) may be partially loaded with one or more of the sample containers (700, 720, 740, 760, 770, 780, 790) before the rack (10, 12) is loaded into the sample analyzer (500), and one or more additional sample containers (700, 720, 740, 760, 770, 780, 790) may be loaded into the rack (10, 12) after the rack (10, 12) has been loaded into the sample analyzer (500).

The exemplary sample analyzer (500) includes a sample presentation unit (SPU) (510). The SPU (510) transfers the rack (10, 12) and thereby transfers the sample containers (700, 720, 740, 760, 770, 780, 790) to various stations within the sample analyzer (500). As illustrated at FIGS. 27-29, the SPU (510) includes a lateral movement section (540) (i.e., an onload-offload lane) and a transverse movement section (550) (i.e., a presentation lane). As depicted, the lateral movement section (540) is substantially perpendicular to the transverse movement section (550). The lateral movement section (540) includes an onload lane (512) and an offload lane (516). A presentation lane (514) of the transverse movement section (550) is positioned between the onload lane (512) and the offload lane (516).

The lateral movement section (540) includes a pusher (536) to advance the rack (10, 12) along the onload lane (512) and the offload lane (516). The transverse movement section (550) includes a carrier (556) to advance the rack (10, 12) along the presentation lane (514). The onload lane (512) includes a first rail (542) (i.e., onload back rail) and a second rail (544) (i.e., onload front rail). The presentation lane (514) includes a third rail (552) (i.e., a carrier back rail, a first hook holder, etc.) and a fourth rail (554) (i.e., carrier front rail, a second hook holder, etc.). The offload lane (516) includes a fifth rail (546) (i.e., offload back rail) and a sixth rail (548) (i.e., offload front rail). The first rail (542) and the fifth rail (546) are aligned with each other. Likewise, the second rail (544) and the sixth rail (548) are aligned with each other and are substantially parallel to the first rail (542) and the fifth rail (546). When the carrier (556) is at a receiving position (e.g., see FIGS. 27 and 28), the third rail (552) is aligned with the first rail (542) and the fifth rail (546), and the fourth rail (554) is aligned with the second rail (544) and the sixth rail (548).

To load the rack (10, 12) into the SPU (510), the hook (122) is engaged with the rail (542, 552, and/or 546), and the hook (124) is engaged with the rail (544, 554, and/or 548). To facilitate placing the rack (10, 12) into the SPU (510), the handle (106) may be manually grasped by an operator. The rack (10, 12) may be loaded into the SPU (510) via automated means (e.g., by a robot, a pick-and-place apparatus, etc.).

When a plurality of the racks (10, 12) are held by the SPU (510), the racks (10, 12) are typically loaded into the SPU (510) at the onload lane (512). The racks (10, 12) may thus be stacked within the SPU (510). For example, a front (222) of one of the racks (10, 12) may abut a rear (224) of another of the racks (10, 12). Where more than two of the racks (10, 12) are held by the SPU (510), the front (222) of one of the racks (10, 12) may abut the rear (224) of another of the racks (10, 12) positioned ahead of it, and the rear (224) of the one of the racks (10, 12) may abut the front (222) of another of the racks (10, 12) positioned behind it. A pattern of abutting racks (10, 12) may thus be formed into a stack. A rear (224) of a rearmost rack (10, 12) may abut the pusher (536).

One or more of the racks (10, 12) may be loaded into the SPU (510) at a time. For example, the hook (122) may be engaged with the rail (542), and the hook (124) may be engaged with the rail (544) to load the racks (10, 12) into the onload lane (512). If needed, (e.g., when others of the racks (10, 12) are already positioned within the SPU (510)), the pusher (536) may be retracted (e.g., moved away from the already positioned racks (10, 12)) and thereby make room for the newly added rack(s) (10, 12). Upon the one or more of the racks (10, 12) being loaded into the SPU (510), the pusher (536) may be advanced (e.g., moved toward the racks (10, 12)) and thereby remove any excess room between the pusher (536) and the rack(s) (10, 12). One or more of the racks (10, 12) may be loaded into the SPU (510) ahead of, in the middle of, or behind the rack(s) (10, 12) already positioned within the SPU (510).

To move the rack(s) (10, 12), and thereby move one or more of the sample containers (700, 720, 740, 760, 770, 780, 790), through/into the sample analyzer (500), the pusher (536) may advance the rack(s) (10, 12) and thereby position at least one of the rack(s) (10, 12) into the presentation lane (514) when the carrier (556) is at the receiving position (e.g., see movement between FIGS. 27 and 28). Upon moving from the onload lane (512) to the presentation lane (514), the hook (122) transfers engagement from the rail (542) to the rail (552), and the hook (124) transfers engagement from the rail (544) to the rail (554). To further move the rack(s) (10, 12), and thereby further move one or more of the sample containers (700, 720, 740, 760, 770, 780, 790), through/into the sample analyzer (500) (e.g., through a gate (558)), the carrier (556) may advance from the receiving position and thereby advance at least one of the rack(s) (10, 12) along the presentation lane (514) (e.g., see movement between FIGS. 28 and 29) further into the sample analyzer (500). Upon reaching a predetermined position within the sample analyzer (500), sample(s) within one or more of the sample containers (700, 720, 740, 760, 770, 780, 790) may be withdrawn and/or otherwise processed and/or analyzed by and/or within the sample analyzer (500).

To remove the rack(s) (10, 12), and thereby remove the one or more of the sample containers (700, 720, 740, 760, 770, 780, 790), through/from the sample analyzer (500), the carrier (556) may retract from the predetermined position to the receiving position and thereby withdraw the at least one of the rack(s) (10, 12) along the presentation lane (514) (e.g., see movement between FIGS. 29 and 28) from the sample analyzer (500). To reach the receiving position (e.g., through the gate (558)), the carrier (556) positions the at least one of the rack(s) (10, 12) along the lateral movement section (540). The pusher (536) may then advance the rack(s) (10, 12) and thereby position the at least one of the rack(s) (10, 12) into the offload lane (516) when the carrier (556) is at the receiving position (e.g., see movement between FIGS. 27 and 28, but with the pusher (536) or a stack of the racks (10, 12) pushing the at least one of the rack(s) (10, 12) out of the carrier (556) and into the offload lane (516)). Upon moving from the presentation lane (514) to the offload lane (516), the hook (122) transfers engagement from the rail (552) to the rail (546), and the hook (124) transfers engagement from the rail (554) to the rail (548). To further move the rack(s) (10, 12), and thereby further move one or more of the sample containers (700, 720, 740, 760, 770, 780, 790), through/from the sample analyzer (500), additional rack(s) (10, 12) may be similarly ejected from the carrier (556) into the offload lane (516) and thereby push the at least one of the rack(s) (10, 12) along the offload lane (516). The racks (10, 12) may similarly be driven off of an end of the offload lane (516) (e.g., into a waste receptacle) and thereby be unloaded from the sample analyzer (500).

Alternatively, to unload the rack (10, 12) from the SPU (510), the hook (122) may be disengaged from the rail (542, 552, and/or 546), and the hook (124) may be disengaged from the rail (544, 554, and/or 548). To facilitate removing the rack (10, 12) from the SPU (510), the handle (106) may be manually grasped by the operator. The rack (10, 12) may be unloaded from the SPU (510) via automated means (e.g., by a robot, a pick-and-place apparatus, etc.). A plurality of the racks (10, 12) may be simultaneously held by the offload lane (516) (similar to the onload lane (512)). The racks (10, 12) are typically unloaded from the SPU (510) at the offload lane (516).

It should be understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

Having shown and described various embodiments of the present disclosure, further adaptations of the methods and systems described herein may be accomplished by appropriate modifications by one of ordinary skill in the art without departing from the scope and the principles of the present disclosure. Several of such potential modifications have been mentioned, and others will be apparent to those skilled in the art. For instance, the examples, embodiments, geometrics, materials, dimensions, ratios, steps, and the like, discussed above, are illustrative and are not required. Accordingly, the scope of the inventive aspects of the present disclosure should be considered in terms of the following claims and is understood not to be limited to the details of structure and operation shown and described in the specification and drawings.

What is claimed is:

1. An apparatus for selectively retaining one or more sample containers for sample evaluation, wherein the apparatus comprises:
   (a) an elongated housing comprising front and rear portions;
   (b) a clamp insert comprising
      a plurality of clamps, wherein the clamp insert is connectable to the housing and positionable within the housing, wherein each clamp in the clamp insert is configured to selectively retain one of the one or more sample containers, and wherein the clamp insert is between the front and rear portions of the housing, and
      a plurality of connection rings, wherein each connection ring comprises a first arm and a second arm of one of the clamps extending upward therefrom;
   (c) a first hook formed in the housing and located at a first longitudinal end of the housing;
   (d) a second hook formed in the housing and located at a second longitudinal end of the housing; and
   (e) a base formed in the housing, wherein the base comprises one or more recesses opening toward a bottom of the base for engaging with a rack handling system to move the apparatus and thereby transport the one or more sample containers selectively retained within the clamp insert of the apparatus;
   wherein the clamp insert further comprises stop members configured to prevent less than a minimum spacing between the clamp insert and the housing by contacting the front and rear portions of the housing.

2. The apparatus of claim 1, wherein the clamp insert is configured to self-center the one or more sample containers within the apparatus.

3. The apparatus of claim 1, wherein the first and second arms have opposing orientations, and wherein the first and second arms are configured to resiliently deflect in opposite directions.

4. The apparatus of claim 1, wherein the housing further comprises one or more limiting members configured to contact the first arm and the second arm to limit a range of deflection for the first arm and the second arm.

5. The apparatus of claim 1, wherein each of the first and second arms comprises one or more guide features configured to direct one of the one or more sample containers into position within the apparatus.

6. The apparatus of claim 1, wherein the housing comprises one or more bottom locators each configured to receive and center one of the one or more sample containers, wherein each of the one or more bottom locators comprise a lower locator area and one or more higher locator areas concentrically arranged around the lower locator area.

7. The apparatus of claim 6, wherein each of the bottom locators is configured to center differing sizes of the one or more sample containers.

8. The apparatus of claim 1, wherein the housing comprises one or more bores within an interior of the housing, wherein the clamp insert comprises one or more posts configured to mate with the one or more bores of the housing to secure the clamp insert within the housing.

9. The apparatus of claim 1, wherein the clamp insert comprises a first extension member and a second extension member, wherein the first extension member is configured to engage with a first slot within the housing, wherein the second extension member is configured to engage with a second slot within the housing, wherein the engagement of the first and second extension members with the respective first and second slots occurs only when the clamp insert is properly aligned relative to the housing.

10. The apparatus of claim 1, wherein the apparatus comprises:
(f) a handle formed in the housing and extending upward from the housing, wherein the handle is configured for lifting the apparatus.

11. The apparatus of claim 1, wherein each clamp in the clamp insert defines a space configured to receive the sample container that the clamp is configured to selectively retain, and wherein the apparatus comprises:
(g) a passage formed in the base, wherein the passage is in fluid communication with each of the plurality of spaces, and wherein the passage extends continuously through the base beneath the plurality of spaces.

12. The apparatus of claim 8, wherein at least some of the one or more posts are on a side of the clamp insert and extend outward horizontally and perpendicular to a longitudinal axis of the clamp insert.

13. The apparatus of claim 8, wherein at least some of the one or more posts are on a side of the clamp insert between two of the connection rings and extend outward horizontally and perpendicular to a longitudinal axis of the clamp insert.

14. The apparatus of claim 8, wherein at least one of the stop members is located above or below each of the one or more posts.

15. The apparatus of claim 1, wherein at least some of the stop members are on a side of the clamp insert.

16. The apparatus of claim 1, wherein at least some of the stop members are on a side of the clamp insert between two of the connection rings.

17. An apparatus for selectively retaining one or more sample containers for sample evaluation, wherein the apparatus comprises:
(a) an elongated housing comprising front and rear portions;
(b) a clamp insert comprising
a plurality of clamps, wherein the clamp insert is connectable to the housing and positionable within the housing, wherein each clamp in the clamp insert is configured to selectively retain one of the one or more sample containers, and wherein the clamp insert is between the front and rear portions of the housing,
a plurality of connection rings, wherein each connection ring comprises a first arm and a second arm of one of the clamps extending upward therefrom,
stop members configured to prevent less than a minimum spacing between the clamp insert and the housing by contacting the front and rear portions of the housing, and
one or more posts extending outward horizontally and perpendicular to a longitudinal axis of the clamp insert, the one or more posts configured to mate with one or more bores of the housing to secure the clamp insert within the housing,
wherein at least some of the stop members and at least some of the one or more posts are on a side of the clamp insert between two of the connection rings, and wherein at least one of the stop members is located above or below each of the one or more posts;
(c) a first hook formed in the housing and located at a first longitudinal end of the housing;
(d) a second hook formed in the housing and located at a second longitudinal end of the housing; and
(e) a base formed in the housing, wherein the base comprises one or more recesses opening toward a bottom of the base for engaging with a rack handling system to move the apparatus and thereby transport the one or more sample containers selectively retained within the clamp insert of the apparatus.

* * * * *